(12) United States Patent
Zhang et al.

(10) Patent No.: US 12,140,664 B2
(45) Date of Patent: Nov. 12, 2024

(54) FACIAL RECOGNITION USING RADIO FREQUENCY SENSING

(71) Applicant: QUALCOMM Incorporated, San Diego, CA (US)

(72) Inventors: Xiaoxin Zhang, Sunnyvale, CA (US); Parthiban Ellappan, Virudhunagar (IN)

(73) Assignee: QUALCOMM Incorporated, San Diego, CA (US)

( * ) Notice: Subject to any disclaimer, the term of this patent is extended or adjusted under 35 U.S.C. 154(b) by 809 days.

(21) Appl. No.: 17/191,463

(22) Filed: Mar. 3, 2021

(65) Prior Publication Data

US 2022/0283296 A1 Sep. 8, 2022

(51) Int. Cl.
| G01S 13/90 | (2006.01) |
| G01S 13/06 | (2006.01) |
| G01S 13/86 | (2006.01) |
| G06F 21/32 | (2013.01) |

(52) U.S. Cl.
CPC .......... *G01S 13/9027* (2019.05); *G01S 13/06* (2013.01); *G01S 13/867* (2013.01); *G01S 13/9029* (2013.01); *G06F 21/32* (2013.01)

(58) Field of Classification Search
CPC .... G01S 13/9027; G01S 13/06; G01S 13/867; G01S 13/9029; G06F 21/32
USPC ..................... 342/90, 351, 104, 58
See application file for complete search history.

(56) References Cited

U.S. PATENT DOCUMENTS

| 9,378,353 B2 | 6/2016 | Polehn |
| 10,325,641 B2 | 6/2019 | Wootton et al. |
| 10,681,568 B1 * | 6/2020 | Hadani ................. H04L 5/0007 |
| 2016/0042169 A1 * | 2/2016 | Polehn ................. H04B 7/0613 726/20 |
| 2020/0019686 A1 | 1/2020 | Min et al. |
| 2020/0273515 A1 | 8/2020 | Wootton et al. |
| 2020/0351576 A1 | 11/2020 | Beg et al. |

FOREIGN PATENT DOCUMENTS

| EP | 3425421 A1 | 1/2019 |
| WO | 2020146476 A1 | 7/2020 |

OTHER PUBLICATIONS

Chen Y., et al., "WiFace: Facial Expression Recognition Using Wi-Fi Signals", IEEE Transactions on Mobile Computing, IEEE Service Center, Los Alamitos, CA, US, vol. 21, No. 1, Jun. 12, 2020 (Jun. 12, 2020), pp. 1-15, XP011891275, ISSN: 1536-1233, DOI:10.1109/TMC.2020.3001989 [retrieved on Dec. 2, 2021], the whole document.

International Search Report and Written Opinion—PCT/US2022/070185—ISA/EPO—Apr. 7, 2022.

* cited by examiner

*Primary Examiner* — Bo Fan

(74) *Attorney, Agent, or Firm* — QUALCOMM Incorporated

(57) ABSTRACT

Disclosed are systems and techniques for detecting user presence, user motion, and for performing facial authentication. For instance, a wireless device can receive a waveform that is a reflection of a transmitted radio frequency (RF) waveform. Based on RF sensing data associated with the received waveform, the wireless device can determine a presence of a user. In response to determining the presence of the user, the wireless device can initiate facial authentication of the user.

12 Claims, 12 Drawing Sheets

FACIAL RECOGNITION USING RADIO FREQUENCY SENSING

FIELD OF THE DISCLOSURE

The present disclosure generally relates to detecting user presence and/or performing facial recognition. Aspects of the disclosure relate to systems and techniques for using radio frequency (RF) sensing to detect user presence and/or perform facial recognition.

BACKGROUND OF THE DISCLOSURE

Wireless electronic devices are capable of providing security features that can be used to prevent unauthorized access to the device. For example, portable electronic devices can include software and hardware components that can place the wireless device in a "locked" state that prevents access to the device by unauthorized users.

Wireless electronic devices can further include hardware and software components that can be used to unlock the device, based on biometric features associated with an authorized user, such as facial or fingerprint authentication. In order to implement various telecommunications functions, wireless electronic devices can include hardware and software components that are configured to transmit and receive radio frequency (RF) signals. For example, a wireless device can be configured to communicate via Wi-Fi, 5G/New Radio (NR), Bluetooth™, and/or ultra-wideband (UWB), among others.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing facial recognition. According to at least one example, a method is provided for performing facial recognition. The method can include: receiving, by a first wireless device, a first received waveform that is a reflection of a first radio frequency (RF) waveform; determining, based on RF sensing data associated with the first received waveform, a presence of a user; and in response to determining the presence of the user, initiating facial authentication of the user.

In another example, a wireless device for facial recognition is provided that includes at least one transceiver, at least one memory, and at least one processor (e.g., configured in circuitry) coupled to the at least one memory and the at least one transceiver. The at least one processor is configured to: receive, via the at least one transceiver, a first received waveform that is a reflection of a first radio frequency (RF) waveform; determine, based on RF sensing data associated with the first received waveform, a presence of a user; and in response to determining the presence of the user, initiate facial authentication of the user.

In another example, a non-transitory computer-readable medium is provided that includes stored thereon at least one instruction that, when executed by one or more processors, cause the one or more processors to: receive, by a first wireless device, a first received waveform that is a reflection of a first radio frequency (RF) waveform; determine, based on RF sensing data associated with the first received waveform, a presence of a user; and in response to determining the presence of the user, initiate facial authentication of the user.

In another example, an apparatus for performing facial recognition is provided. The apparatus includes: means for receiving a first received waveform that is a reflection of a first RF waveform; means for determining, based on RF sensing data associated with the first received waveform, a presence of a user; and in response to determining the presence of the user, means for initiating facial authentication of the user.

In another example, a method for determining presence of a user is provided. The method can include: processing, by a wireless device, a first received waveform that is a reflection of a first radio frequency (RF) waveform; determining, based on RF sensing data associated with the first received waveform, a presence of a user; in response to determining the presence of the user, transmitting a second RF waveform having a higher bandwidth than the first RF waveform; processing a second received waveform that is a reflection of the second RF waveform from the user; and determining, based on RF sensing data associated with the second received waveform, at least one of a head presence of the user or a head orientation of the user.

In another example, a wireless device for determining presence of a user is provided that includes at least one transceiver, at least one memory, and at least one processor (e.g., configured in circuitry) coupled to the at least one memory and the at least one transceiver. The at least one processor is configured to: process a first received waveform that is a reflection of a first radio frequency (RF) waveform; determine, based on RF sensing data associated with the first received waveform, a presence of a user; in response to determining the presence of the user, transmit, via the at least one transceiver, a second RF waveform having a higher bandwidth than the first RF waveform; process a second received waveform that is a reflection of the second RF waveform from the user; and determine, based on RF sensing data associated with the second received waveform, at least one of a head presence of the user or a head orientation of the user.

In another example, a non-transitory computer-readable medium is provided that includes stored thereon at least one instruction that, when executed by one or more processors, cause the one or more processors to: process a first received waveform that is a reflection of a first radio frequency (RF) waveform; determine, based on RF sensing data associated with the first received waveform, a presence of a user; in response to determining the presence of the user, transmit, via at least one transceiver, a second RF waveform having a higher bandwidth than the first RF waveform; process a second received waveform that is a reflection of the second RF waveform from the user; and determine, based on RF sensing data associated with the second received waveform, at least one of a head presence of the user or a head orientation of the user.

In another example, an apparatus for determining presence of a user is provided. The apparatus includes: means for processing a first received waveform that is a reflection of a first radio frequency (RF) waveform; means for determining, based on RF sensing data associated with the first received waveform, a presence of a user; means for transmitting, in response to determining the presence of the user, a second RF waveform having a higher bandwidth than the first RF waveform; means for processing a second received waveform that is a reflection of the second RF waveform from the user; and means for determining, based on RF sensing data associated with the second received waveform, at least one of a head presence of the user or a head orientation of the user.

In some aspects, the apparatus is or is part of a wireless device, such as mobile device (e.g., a mobile telephone or so-called "smart phone" or other mobile device), a wearable device, an extended reality device (e.g., a virtual reality (VR) device, an augmented reality (AR) device, or a mixed reality (MR) device), a tablet, a personal computer, a laptop computer, a server computer, a wireless access point, a vehicle or component of a vehicle, or other any other device having an RF interface.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
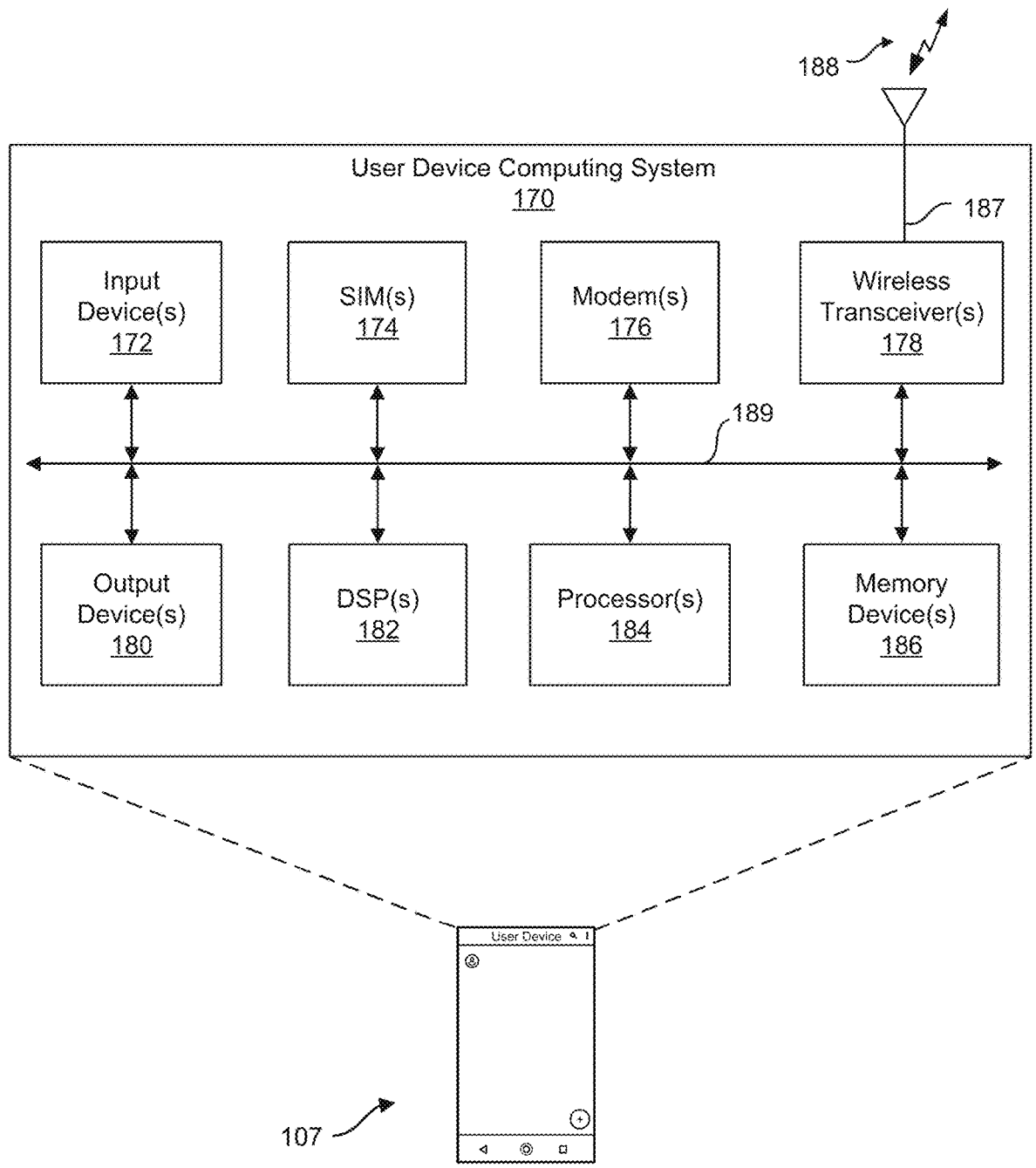
FIG. 1 is a block diagram illustrating an example of a computing system of a user device, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Many portable electronic devices, such as smartphones, tablets, and laptops, are capable of performing facial recognition. For example, portable electronic devices can utilize facial recognition to perform authentication, such as for validating user identities (e.g., to check if the attempting device access is enrolled in a database of authorized users). Facial authentication has many applications, such as for performing device access control, e.g., "unlocking" access to the device, to provide access to a specific application or service, among others.

In other examples, facial recognition can be used by portable electronic devices to implement display management features based on a user's attention to the device. For instance, front-facing sensors (e.g., dot projector/s, and/or camera/s) of the device can be used to facilitate facial recognition for the purpose of initializing and/or persisting the device display, for example, so long as the user is looking at the screen. Other examples of device actions that can be based on a user's attention are automatic changes to display brightness levels, device "lock" timeout, and/or adjustments to alert volume, etc.

Some existing facial recognition systems utilize an infrared (IR) light source to illuminate a user's face and an infrared (IR) camera to perform image capture. In some cases, the captured image can then be processed and compared with a stored registered face in order to perform user authentication. While existing facial recognition systems are generally reliable, the power consumption of such systems can be high. To overcome this issue, the facial recognition systems on wireless devices are often only triggered upon detection of some type of user activity or predetermined condition, e.g., tapping on screen, device movement, incoming notification, etc. In the absence of these triggers, the facial recognition systems are disabled when the device is locked to conserve battery life. Consequently, the existing systems have an inherent latency in performing facial recognition in order to authenticate a user and "unlock" a device.

The high power consumption of existing facial recognition systems is also problematic when implementing user aware features for display management. While such features may not require the level of accuracy required of facial recognition systems that are used for facial authentication, the absence of a more efficient alternative necessitates the use of the existing system, which adversely affects the device's battery life.

In addition to the concerns related to high power consumption, some facial recognition systems fail to function properly when exposed to direct light sources, such as sunlight, because intense incident light may interfere with the IR image fidelity. Another problem is that existing facial recognition systems can fail if the user is wearing certain glasses that filter or block IR light. Furthermore, existing facial recognition systems can be susceptible to falsely authenticating a user based on a photograph of the user.

It would be desirable to develop a technique that would permit a device to implement facial recognition that reduces activation latency while also improving power management to reduce overall power consumption and conserve battery life. Moreover, it would be desirable to develop a technique that overcomes issues related to facial recognition in direct sunlight or with any types of glasses, and that would also decrease likelihood of any false authentication. Furthermore, it would be desirable to leverage existing radio frequency (RF) interfaces on devices to perform these techniques.

Systems, apparatuses, processes (also referred to as methods), and computer-readable media (collectively referred to as "systems and techniques") are described herein for performing facial recognition. While the systems and techniques are described herein with respect to facial recognition, the systems and techniques can be used to perform recognition of other body parts and/or objects, such as walls, furniture, doors, etc. The systems and techniques described herein can also be used for tracking the movement of users, animals, objects, etc.

The systems and techniques provide the ability for an electronic device to collect RF sensing data that can be used to perform facial recognition, detect motion, determine the presence of a user's head and/or other body part (e.g., portion of head, face, head/neck region, hands, eyes, etc.), determine the orientation of the user's face, and/or perform facial authentication. In some aspects, the RF sensing data can be collected by utilizing wireless interfaces that are capable of simultaneously performing transmit and receive functions (e.g., a monostatic configuration). In other aspects, the RF sensing data can be collected by utilizing a bistatic configuration in which the transmit and receive functions are performed by different devices (e.g., a first wireless device transmits an RF waveform and a second wireless device receives the RF waveform and any corresponding reflections). Examples will be described herein using Wi-Fi as an illustrative example. However, the systems and techniques are not limited to Wi-Fi. For example, in some cases, the systems and techniques can be implemented using 5G/New Radio (NR), such as using millimeter wave (mmWave) technology. In some cases, the systems and techniques can be implemented using other wireless technologies, such as Bluetooth™ ultra-wideband (UWB), among others.

In some aspects, a device can include a Wi-Fi interface that is configured to implement algorithms having varying levels of RF sensing resolution based upon a bandwidth of a transmitted RF signal, a number of spatial streams, a number of antennas configured to transmit an RF signal, a number of antennas configured to receive an RF signal, a number of spatial links (e.g., number of spatial streams multiplied by number of antennas configured to receive an RF signal), a sampling rate, or any combination thereof. For example, the Wi-Fi interface of the device can be configured to implement a low-resolution RF sensing algorithm that consumes a small amount of power and can operate in the background when the device is in a "locked" state and/or in a "sleep" mode. In some instances, the low-resolution RF sensing algorithm can be used by the device as a coarse detection mechanism that can sense motion within a certain proximity of the device. In certain aspects, the low-resolution RF sensing algorithm can be used as a trigger to initiate the device's facial recognition system and can provide a lower latency than existing triggers (e.g., device motion, tapping screen, alert, etc.). In some aspects, the detection of motion by using the low-resolution RF sensing algorithm can trigger the device to perform a higher resolution RF sensing algorithm (e.g., a mid-resolution RF sensing algorithm, a high-resolution RF sensing algorithm, or other higher resolution RF sensing algorithm, as discussed herein) prior to initiating facial recognition.

In some examples, the device's Wi-Fi interface can be configured to implement a mid-resolution RF sensing algorithm. The transmitted RF signal that is utilized for the mid-resolution RF sensing algorithm can differ from the low-resolution RF sensing algorithm by having a higher bandwidth, a higher number of spatial streams, a higher number of spatial links (e.g., a higher number of antennas configured to receive an RF signal and/or a higher number of spatial streams), a higher sampling rate (corresponding to a smaller sampling interval), or any combination thereof. In some instances, the mid-resolution RF sensing algorithm can be used to detect the presence of a user's head (or other body part, such as face, eyes, etc.) as well as motion that is in the device's proximity. In some examples, the mid-resolution RF sensing algorithm can be invoked in response to detecting motion in the proximity of the device by using the low-resolution RF sensing algorithm, as noted above. In some cases, the mid-resolution RF sensing algorithm may focus its detection on the user's head by utilizing digital signal processing to filter signals that are not reflected from a direction that faces the device's screen. In certain examples, the mid-resolution RF sensing algorithm can also be used as a trigger to initiate the device's facial recognition system and can provide a lower latency than existing triggers (e.g., device motions, touch-screen interactions, alerts, etc.). In some cases, detecting the presence of the user's head by using the mid-resolution RF sensing algorithm can trigger the device to perform a higher resolution RF sensing algorithm (e.g., a high-resolution RF sensing algorithm or other higher resolution RF sensing algorithm, as discussed herein) prior to initiating facial recognition.

In another example, the device's Wi-Fi interface can be configured to implement a high-resolution RF sensing algorithm. The transmitted RF signal that is utilized for the high-resolution RF sensing algorithm can differ from the mid-resolution RF sensing algorithm and the low-resolution RF sensing algorithm by having a higher bandwidth, a higher number of spatial streams, a higher number of spatial links (e.g., a higher number of antennas configured to receive an RF signal and/or a higher number of spatial streams), a higher sampling rate, or any combination thereof. In some instances, the high-resolution RF sensing algorithm can be used to detect the orientation of a user's head (e.g., whether the user is facing the phone or looking elsewhere), the presence of the user's head, and/or motion in the proximity of the device. In some examples, the high-resolution RF sensing algorithm can be invoked in response to detecting motion in the proximity of the device and/or in response to detecting the presence of the user's head (or other body part, such as face, eyes, etc.). In some aspects, the high-resolution RF sensing algorithm may utilize digital signal processing to filter signals that are not reflected from a direction that faces the device's screen. In certain cases, the high-resolution RF sensing algorithm can be used as a trigger to initiate a device's facial recognition system and can provide a lower latency than existing facial recognition triggers discussed above.

In some examples, the Wi-Fi interface of the device can be configured to implement a facial authentication RF sensing algorithm. In one implementation, a device may utilize an RF interface that is capable of transmitting extremely high frequency (EHF) signals or mmWave technology (e.g., IEEE 802.11ad) to perform facial recognition. For instance, the device can include an mmWave RF interface. In some examples, the mmWave RF interface can utilize one or more directional antennas that are configured to transmit signals in a direction that is perpendicular to the device screen. For example, the device can utilize the mmWave RF interface to perform narrow beam sweeping to obtain time of flight and phase measurements at different angles from various signals reflected from the user's face. In some examples, the device can utilize the time of flight and phase measurements to generate face signatures. The device can compare the face signatures with calibrated face metrics that are stored in the system for facial recognition.

Implementation of facial recognition according to such systems and techniques can advantageously function in direct sunlight or with a user that is wearing IR blocking glasses. In addition, facial recognition according to these systems and techniques can incorporate three-dimensional data for the user's face and can therefore yield greater accuracy than existing systems.

In some examples, the systems and techniques can perform RF sensing associated with each of the aforementioned algorithms by implementing a device's Wi-Fi interface having at least two antennas that can be used to simultaneously transmit and receive an RF signal. In some instances, the antennas can be omnidirectional such that RF signals can be received from and transmitted in all directions. For example, a device may utilize a transmitter of its Wi-Fi interface to transmit an RF signal and simultaneously enable a Wi-Fi receiver of the Wi-Fi interface so that the device may capture any signals reflected from the user. The Wi-Fi receiver can also be configured to detect leakage signals that are transferred from the Wi-Fi transmitter's antenna to the Wi-Fi receiver's antenna without reflecting from any objects. In doing so, the device may gather RF sensing data in the form of channel state information (CSI) data relating to the direct paths (leakage signals) of the transmitted signal together with data relating to the reflected paths of the signals received that correspond to the transmitted signal.

In some aspects, the CSI data can be used to calculate the distance of the reflected signals as well as the angle of arrival. The distance and angle of the reflected signals can be used to detect motion, determine the presence of a user's head, face, eyes, feet, hands, etc., and/or determine the orientation of the user's face as discussed above. In some examples, the distance of the reflected signals and the angle of arrival can be determined using signal processing, machine learning algorithms, using any other suitable technique, or any combination thereof. In one example, the distance of the reflected signals can be calculated by measuring the difference in time from reception of the leakage signal to the reception of the reflected signals. In another example, the angle of arrival can be calculated by utilizing an antenna array to receive the reflected signals and measuring the difference in received phase at each element of the antenna array. In some instances, the distance of the reflected signals together with the angle of arrival of the reflected signals can be used to identify presence and orientation characteristics of a user, such as by identifying the presence and/or orientation of the user's head.

In some examples, one or more of the various RF sensing algorithms discussed herein can be used to perform device management functions that are based on a user's awareness. For instance, one or more of the RF sensing algorithms can be used to determine a head orientation of a user. The user's head orientation can then be used to infer whether the user is directing attention at the device screen or elsewhere. Such an implementation can result in lower power consumption than existing systems which utilize facial authentication to ascertain user awareness.

Various aspects of the systems and techniques described herein will be discussed below with respect to the figures. FIG. 1 illustrates an example of a computing system 170 of a user device 107. The user device 107 is an example of a device that can be used by an end-user. For example, the user device 107 can include a mobile phone, router, tablet computer, laptop computer, tracking device, wearable device (e.g., a smart watch, glasses, an XR device, etc.), Internet of Things (IoT) device, a vehicle (or a computing device of a vehicle), and/or another device used by a user to communicate over a wireless communications network. In some cases, the device can be referred to as a station (STA), such as when referring to a device configured to communicate using the Wi-Fi standard. In some cases, the device can be referred to as user equipment (UE), such as when referring to a device configured to communicate using 5G/New Radio (NR), Long-Term Evolution (LTE), or other telecommunication standard.

The computing system 170 includes software and hardware components that can be electrically or communicatively coupled via a bus 189 (or may otherwise be in communication, as appropriate). For example, the computing system 170 includes one or more processors 184. The one or more processors 184 can include one or more CPUs, ASICs, FPGAs, APs, GPUs, VPUs, NSPs, microcontrollers, dedicated hardware, any combination thereof, and/or other processing device/s and/or system/s. The bus 189 can be used by the one or more processors 184 to communicate between cores and/or with the one or more memory devices 186.

The computing system 170 may also include one or more memory devices 186, one or more digital signal processors (DSPs) 182, one or more subscriber identity modules (SIMs) 174, one or more modems 176, one or more wireless transceivers 178, one or more antennas 187, one or more input devices 172 (e.g., a camera, a mouse, a keyboard, a touch sensitive screen, a touch pad, a keypad, a microphone, and/or the like), and one or more output devices 180 (e.g., a display, a speaker, a printer, and/or the like).

The one or more wireless transceivers 178 can receive wireless signals (e.g., signal 188) via antenna 187 from one or more other devices, such as other user devices, network devices (e.g., base stations such as eNBs and/or gNBs, WiFi access points (APs) such as routers, range extenders or the like, etc.), cloud networks, and/or the like. In some examples, the computing system 170 can include multiple antennas or an antenna array that can facilitate simultaneous transmit and receive functionality. Antenna 187 can be an omnidirectional antenna such that RF signals can be received from and transmitted in all directions. The wireless signal 188 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 178 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 188 into a baseband or intermediate frequency and can convert the RF signals to the digital domain.

In some cases, the computing system 170 can include a coding-decoding device (or CODEC) configured to encode and/or decode data transmitted and/or received using the one or more wireless transceivers 178. In some cases, the computing system 170 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 178.

The one or more SIMs 174 can each securely store an international mobile subscriber identity (IMSI) number and related key assigned to the user of the user device 107. The IMSI and key can be used to identify and authenticate the subscriber when accessing a network provided by a network service provider or operator associated with the one or more SIMs 174. The one or more modems 176 can modulate one or more signals to encode information for transmission using the one or more wireless transceivers 178. The one or more modems 176 can also demodulate signals received by the one or more wireless transceivers 178 in order to decode the transmitted information. In some examples, the one or more modems 176 can include a WiFi modem, a 4G (or LTE) modem, a 5G (or NR) modem, and/or other types of modems. The one or more modems 176 and the one or more wireless transceivers 178 can be used for communicating data for the one or more SIMs 174.

The computing system 170 can also include (and/or be in communication with) one or more non-transitory machine-readable storage media or storage devices (e.g., one or more memory devices 186), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 186 and executed by the one or more processor(s) 184 and/or the one or more DSPs 182. The computing system 170 can also include software elements (e.g., located within the one or more memory devices 186), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 2:
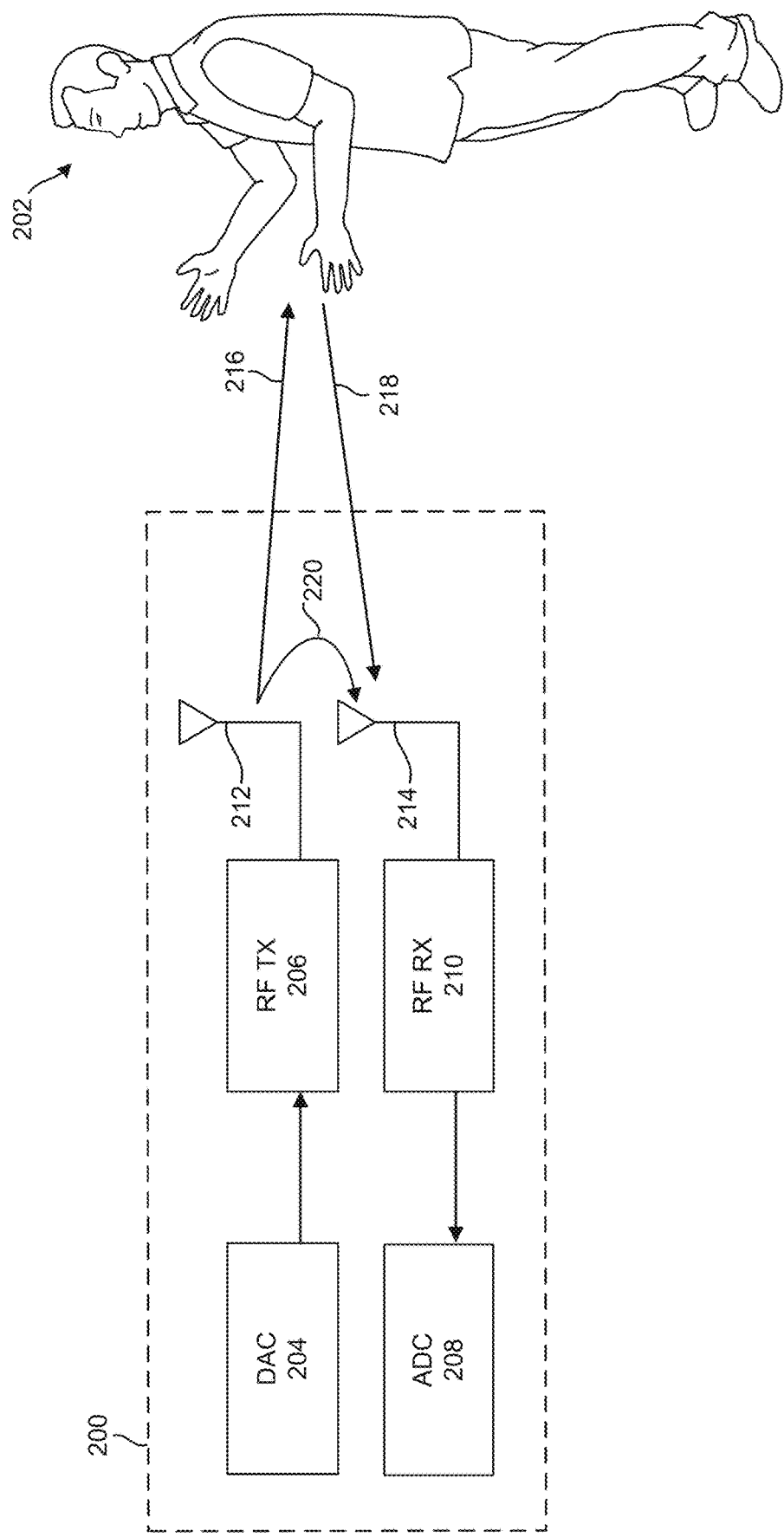
FIG. 2 is a diagram illustrating an example of a wireless device utilizing radio frequency (RF) sensing techniques to detect user presence and perform facial recognition, in accordance with some examples.

FIG. 2 is a diagram illustrating an example of a wireless device 200 that utilizes RF sensing techniques to perform one or more functions, such as detecting a presence of a user 202, detecting orientation characteristics of the user, performing facial recognition, any combination thereof, and/or perform other functions. In some examples, the wireless device 200 can be the user device 107, such as a mobile phone, a tablet computer, a wearable device, or other device that includes at least one RF interface. In some examples, the wireless device 200 can be a device that provides connectivity for a user device (e.g., for user device 107), such as a wireless access point (AP), a base station (e.g., a gNB, eNB, etc.), or other device that includes at least one RF interface.

In some aspects, wireless device 200 can include one or more components for transmitting an RF signal. Wireless device 200 can include a digital-to-analog converter (DAC) 204 that is capable of receiving a digital signal or waveform (e.g., from a microprocessor, not illustrated) and converting the signal or waveform to an analog waveform. The analog signal that is the output of DAC 204 can be provided to RF transmitter 206. The RF transmitter 206 can be a Wi-Fi transmitter, a 5G/NR transmitter, a Bluetooth™ transmitter, or any other transmitter capable of transmitting an RF signal.

RF transmitter 206 can be coupled to one or more transmitting antennas such as TX antenna 212. In some examples, TX antenna 212 can be an omnidirectional antenna that is capable of transmitting an RF signal in all directions. For example, TX antenna 212 can be an omni-directional Wi-Fi antenna that can radiate Wi-Fi signals (e.g., 2.4 GHz, 5 GHz, 6 GHz, etc.) in a 360-degree radiation pattern. In another example, TX antenna 212 can be a directional antenna that transmits an RF signal in a particular direction.

In some examples, wireless device 200 can also include one or more components for receiving an RF signal. For example, the receiver lineup in wireless device 200 can include one or more receiving antennas such as RX antenna 214. In some examples, RX antenna 214 can be an omni-directional antenna capable of receiving RF signals from multiple directions. In other examples, RX antenna 214 can be a directional antenna that is configured to receive signals from a particular direction. In further examples, both TX antenna 212 and RX antenna 214 can include multiple antennas (e.g., elements) configured as an antenna array.

Wireless device 200 can also include an RF receiver 210 that is coupled to RX antenna 214. RF receiver 210 can include one or more hardware components for receiving an RF waveform such as a Wi-Fi signal, a Bluetooth® signal, a 5G/NR signal, or any other RF signal. The output of RF receiver 210 can be coupled to an analog-to-digital converter (ADC) 208. ADC 208 can be configured to convert the received analog RF waveform into a digital waveform that can be provided to a processor such as a digital signal processor (not illustrated).

In one example, wireless device 200 can implement RF sensing techniques by causing TX waveform 216 to be transmitted from TX antenna 212. Although TX waveform 216 is illustrated as a single line, in some cases, TX waveform 216 can be transmitted in all directions by an omnidirectional TX antenna 212. In one example, TX waveform 216 can be a Wi-Fi waveform that is transmitted by a Wi-Fi transmitter in wireless device 200. In some cases, TX waveform 216 can correspond to a Wi-Fi waveform that is transmitted at or near the same time as a Wi-Fi data communication signal or a Wi-Fi control function signal (e.g., a beacon transmission). In some examples, TX waveform 216 can be transmitted using the same or a similar frequency resource as a Wi-Fi data communication signal or a Wi-Fi control function signal (e.g., a beacon transmission). In some aspects, TX waveform 216 can correspond to a Wi-Fi waveform that is transmitted separately from a Wi-Fi data communication signal and/or a Wi-Fi control signal (e.g., TX waveform 216 can be transmitted at different times and/or using a different frequency resource).

In some examples, TX waveform 216 can correspond to a 5G NR waveform that is transmitted at or near the same time as a 5G NR data communication signal or a 5G NR control function signal. In some examples, TX waveform 216 can be transmitted using the same or a similar frequency resource as a 5G NR data communication signal or a 5G NR control function signal. In some aspects, TX waveform 216 can correspond to a 5G NR waveform that is transmitted separately from a 5G NR data communication signal and/or a 5G NR control signal (e.g., TX waveform 216 can be transmitted at different times and/or using a different frequency resource).

In some aspects, one or more parameters associated with TX waveform 216 can be modified that may be used to increase or decrease RF sensing resolution. The parameters may include frequency, bandwidth, number of spatial streams, the number of antennas configured to transmit TX waveform 216, the number of antennas configured to receive a reflected RF signal corresponding to TX waveform 216, the number of spatial links (e.g., number of spatial streams multiplied by number of antennas configured to receive an RF signal), the sampling rate, or any combination thereof.

In further examples, TX waveform 216 can be implemented to have a sequence that has perfect or almost perfect autocorrelation properties. For instance, TX waveform 216 can include single carrier Zadoff sequences or can include symbols that are similar to orthogonal frequency-division multiplexing (OFDM) Long Training Field (LTF) symbols. In some cases, TX waveform 216 can include a chirp signal, as used, for example, in a Frequency-Modulated Continuous-Wave (FM-CW) radar system. In some configurations, the chirp signal can include a signal in which the signal frequency increases and/or decreases periodically in a linear and/or an exponential manner.

In some aspects, wireless device 200 can further implement RF sensing techniques by performing concurrent transmit and receive functions. For example, wireless device 200 can enable its RF receiver 210 to receive at or near the same time as it enables RF transmitter 206 to transmit TX waveform 216. In some examples, transmission of a sequence or pattern that is included in TX waveform 216 can be repeated continuously such that the sequence is transmitted a certain number of times or for a certain duration of time. In some examples, repeating a pattern in the transmission of TX waveform 216 can be used to avoid missing the reception of any reflected signals if RF receiver 210 is enabled after RF transmitter 206. In one example implementation, TX waveform 216 can include a sequence having a sequence length L that is transmitted two or more times, which can allow RF receiver 210 to be enabled at a time less than or equal to L in order to receive reflections corresponding to the entire sequence without missing any information.

By implementing simultaneous transmit and receive functionality, wireless device 200 can receive any signals that correspond to TX waveform 216. For example, wireless device 200 can receive signals that are reflected from objects or people that are within range of TX waveform 216, such as RX waveform 218 reflected from user 202. Wireless device 200 can also receive leakage signals (e.g., TX leakage signal 220) that are coupled directly from TX antenna 212 to RX antenna 214 without reflecting from any objects. For example, leakage signals can include signals that are transferred from a transmitter antenna (e.g., TX antenna 212) on a wireless device to a receive antenna (e.g., RX antenna 214) on the wireless device without reflecting from any objects. In some cases, RX waveform 218 can include multiple sequences that correspond to multiple copies of a sequence that are included in TX waveform 216. In some examples, wireless device 200 can combine the multiple sequences that are received by RF receiver 210 to improve the signal to noise ratio (SNR).

Wireless device 200 can further implement RF sensing techniques by obtaining RF sensing data associated with each of the received signals corresponding to TX waveform 216. In some examples, the RF sensing data can include channel state information (CSI) data relating to the direct paths (e.g., leakage signal 220) of TX waveform 216 together with data relating to the reflected paths (e.g., RX waveform 218) that correspond to TX waveform 216.

In some aspects, RF sensing data (e.g., CSI data) can include information that can be used to determine the manner in which an RF signal (e.g., TX waveform 216) propagates from RF transmitter 206 to RF receiver 210. RF sensing data can include data that corresponds to the effects on the transmitted RF signal due to scattering, fading, and/or power decay with distance, or any combination thereof. In some examples, RF sensing data can include imaginary data and real data (e.g., I/Q components) corresponding to each tone in the frequency domain over a particular bandwidth.

In some examples, RF sensing data can be used to calculate distances and angles of arrival that correspond to reflected waveforms, such as RX waveform 218. In further examples, RF sensing data can also be used to detect motion, determine location, detect changes in location or motion patterns, obtain channel estimation, or any combination thereof. In some cases, the distance and angle of arrival of the reflected signals can be used to identify the size, position, movement, or orientation of users in the surrounding environment (e.g., user 202) in order to detect user presence/proximity, detect user attention, and/or perform facial recognition as well as user authentication (e.g., facial authentication).

Wireless device 200 can calculate distances and angles of arrival corresponding to reflected waveforms (e.g., the distance and angle of arrival corresponding to RX waveform 218) by utilizing signal processing, machine learning algorithms, using any other suitable technique, or any combination thereof. In other examples, wireless device 200 can send the RF sensing data to another computing device, such as a server, that can perform the calculations to obtain the distance and angle of arrival corresponding to RX waveform 218 or other reflected waveforms.

In one example, the distance of RX waveform 218 can be calculated by measuring the difference in time from reception of the leakage signal to the reception of the reflected signals. For example, wireless device 200 can determine a baseline distance of zero that is based on the difference from the time the wireless device 200 transmits TX waveform 216 to the time it receives leakage signal 220 (e.g., propagation delay). Wireless device 200 can then determine a distance associated with RX waveform 218 based on the difference from the time the wireless device 200 transmits TX waveform 216 to the time it receives RX waveform 218 (e.g., time of flight), which can then be adjusted according to the propagation delay associated with leakage signal 220. In doing so, wireless device 200 can determine the distance traveled by RX waveform 218 which can be used to determine the presence and movement of a user (e.g., user 202) that caused the reflection.

In further examples, the angle of arrival of RX waveform 218 can be calculated by measuring the time difference of arrival of RX waveform 218 between individual elements of a receive antenna array, such as antenna 214. In some examples, the time difference of arrival can be calculated by measuring the difference in received phase at each element in the receive antenna array.

In some cases, the distance and the angle of arrival of RX waveform 218 can be used to determine the distance between wireless device 200 and user 202 as well as the position of user 202 relative to wireless device 200. The distance and the angle of arrival of RX waveform 218 can also be used to determine presence, movement, proximity, attention, identity, or any combination thereof, of user 202. For example, wireless device 200 can utilize the calculated distance and angle of arrival corresponding to RX waveform 218 to determine that user 202 is walking towards wireless device 200. Based on the proximity of user 202 to wireless device 200, wireless device 200 can activate facial authentication in order to unlock the device. In some aspects, facial authentication can be activated based upon user 202 being within a threshold distance of wireless device 200. Examples of threshold distances can include 2 feet, 1 foot, 6 inches, 3 inches, or any other distance.

As noted above, wireless device 200 can include mobile devices (e.g., smartphones, laptops, tablets, etc.) or other types of devices. In some examples, wireless device 200 can be configured to obtain device location data and device orientation data together with the RF sensing data. In some instances, device location data and device orientation data can be used to determine or adjust the distance and angle of arrival of a reflected signal such as RX waveform 218. For example, wireless device 200 may be set on a table facing the ceiling as user 202 walks towards it during the RF sensing process. In this instance, wireless device 200 can use its location data and orientation data together with the RF sensing data to determine the direction that the user 202 is walking.

In some examples, device position data can be gathered by wireless device 200 using techniques that include round trip time (RTT) measurements, passive positioning, angle of arrival, received signal strength indicator (RSSI), CSI data, using any other suitable technique, or any combination thereof. In further examples, device orientation data can be obtained from electronic sensors on the wireless device 200, such as a gyroscope, an accelerometer, a compass, a magnetometer, a barometer, any other suitable sensor, or any combination thereof.

Figure 3:
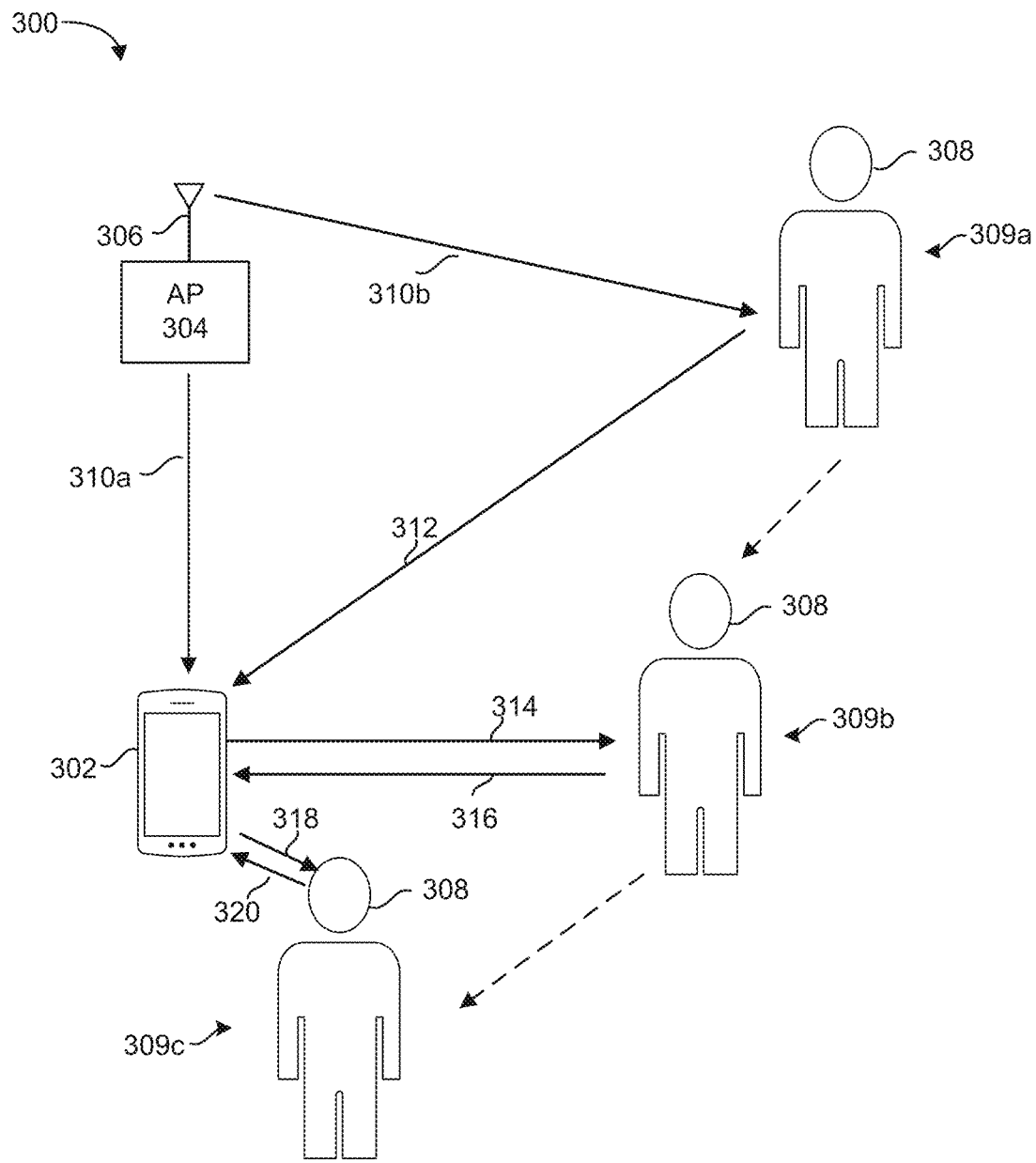
FIG. 3 is a diagram illustrating an example of an environment including wireless devices for detecting user presence and performing facial recognition, in accordance with some examples.

FIG. 3 is a diagram illustrating an environment 300 that includes a wireless device 302, an access point (AP) 304, and a user 308. The wireless device 302 can include a user device (e.g., user device 107 of FIG. 1, such as a mobile device or any other type of device). The AP 304 can also be referred to as a wireless device in some examples. As shown, the user 308 can move to different positions (e.g., with the wireless device 302), including a first user position 309a, a second user position 309b, and a third user position 309c. In some aspects, the wireless device 302 and AP 304 can each be configured to perform RF sensing in order to detect a presence of the user 308, detect movement of the user 308, perform facial recognition of the user 308, any combination thereof, and/or perform other functions with respect to the user 308.

In some aspects, AP 304 can be a Wi-Fi access point that includes hardware and software components that can be configured to simultaneously transmit and receive RF signals, such as the components described herein with respect to the wireless device 200 of FIG. 2. For example, AP 304 can include one or more antennas that can be configured to transmit an RF signal and one or more antennas that can be configured to receive an RF signal (e.g., antenna 306). As noted with respect to the wireless device 200 of FIG. 2, AP 304 can include omnidirectional antennas or antenna arrays that are configured to transmit and receive signals from any direction.

In some aspects, the AP 304 and the wireless device 302 can be configured to implement a bistatic configuration in which the transmit and receive functions are performed by different devices. For example, AP 304 can transmit an omnidirectional RF signal that can include signal 310a and signal 310b. As illustrated, signal 310a can travel directly (e.g., no reflections) from AP 304 to wireless device 302 and signal 310b can reflect off of user 308 at position 309a and cause a corresponding reflected signal 312 to be received by wireless device 302.

In some examples, wireless device 302 can utilize RF sensing data associated with signal 310a and signal 310b to determine presence, location, orientation, and/or movement of user 308 at position 309a. For instance, wireless device 302 can obtain, retrieve, and/or estimate location data associated with AP 304. In some aspects, wireless device 302 can use location data associated with AP 304 and RF sensing data (e.g., CSI data) to determine the time of flight, distance, and/or the angle of arrival associated signals transmitted by AP 304 (e.g., direct path signals such as signal 310a and reflected path signals such as signal 312). In some cases, AP 304 and wireless device 302 can further send and/or receive communication that can include data associated with RF signal 310a and/or reflected signal 312 (e.g., transmission time, sequence/pattern, time of arrival, angle of arrival, etc.).

In some examples, the wireless device 302 can be configured to perform RF sensing using a monostatic configuration, in which case the wireless device 302 performs both the transmit and receive functions (e.g., simultaneous TX/RX discussed in connection with wireless device 200). For instance, wireless device 302 can detect a presence or movement of user 308 at position 309b by transmitting RF signal 314, which can cause a reflected signal 316 from user 308 at position 309b to be received by wireless device 302.

In some aspects, wireless device 302 can obtain RF sensing data associated with reflected signal 316. For example, RF sensing data can include CSI data corresponding to reflected signal 316. In further aspects, wireless device 302 can use the RF sensing data to calculate a distance and an angle of arrival corresponding to reflected signal 316. For instance, wireless device 302 can determine distance by calculating a time of flight for reflected signal 316 based on the difference between a leakage signal (not illustrated) and reflected signal 316. In further examples, wireless device 302 can determine an angle of arrival by utilizing an antenna array to receive the reflected signals and measuring the difference in received phase at each element of the antenna array.

In some examples, wireless device 302 can obtain RF sensing data in the form of CSI data that can be used to formulate a matrix that is based on the number of frequencies represented as 'K' (e.g., tones) and the number of antenna array elements represented as 'N'. In one technique, the CSI matrix can be formulated according to the relationship given by equation (1):

$$\text{CSI Matrix: } H=[h_{ik}], i=1, \ldots, N, k=1, \ldots, K \quad (1)$$

Upon formulating the CSI matrix, wireless device 302 can calculate the angle of arrival and time of flight for direct signal paths (e.g., leakage signals), as well as reflected signal paths (e.g., reflected signal 316) by utilizing a Two-Dimensional Fourier transform. In one example, a Fourier transform can be defined by the relationship given by equation (2) below, in which K corresponds to a number of tones in the frequency domain; N corresponds to a number of receive antennas; $h_{ik}$ corresponds to CSI data captured on the ith antenna and kth tone (e.g., a complex number having a real and an imaginary component); $f_0$ corresponds to a carrier frequency; l corresponds to an antenna spacing; c corresponds to the speed of light; and $\Delta f$ corresponds to a frequency spacing between two adjacent tones. The relationship of equation (2) is provided as follows:

$$F(\theta, d) = \sum_{i=1}^{N} \sum_{k=1}^{K} h_{ik} e^{j\frac{2\pi f_0 i l \sin\theta}{c}} e^{j\frac{2\pi d k \Delta f}{c}} \quad (2)$$

In some aspects, leakage signals (e.g., leakage signal 220 and/or other leakage signals) can be cancelled by using an iterative cancellation method.

In some cases, wireless device 302 can utilize the distance and an angle of arrival corresponding to reflected signal 316 to detect a presence or movement of user 308 at position 309b. In other examples, wireless device 302 can detect further movement of the user 308 to a third position 309c. Wireless device 302 can transmit RF signal 318 that causes reflected signal 320 from user 308 at position 309c. Based on the RF sensing data associated with reflected signal 320, wireless device 302 can determine the presence of user 308 at position 309c, detect the user's head presence and/or orientation, and perform facial recognition as well as facial authentication.

In some implementations, wireless device 302 may utilize artificial intelligence or machine learning algorithms to perform motion detection, object classification, and/or detect head orientation relating to user 308. In some examples, the machine learning techniques can include supervised machine learning techniques such as those that utilize neural networks, linear and logistics regression, classification trees, support vector machine, any other suitable supervised machine learning technique, or any combination thereof. For instance, a dataset of sample RF sensing data can be selected for training of the machine learning algorithms or artificial intelligence.

In some aspects, wireless device 302 and AP 304 can perform RF sensing techniques irrespective of their association with each other or with a Wi-Fi network. For example, wireless device 302 can utilize its Wi-Fi transmitter and Wi-Fi receiver to perform RF sensing as discussed herein when it is not associated with any access point or Wi-Fi network. In further examples, AP 304 can perform RF sensing techniques regardless of whether it has any wireless devices associated with it.

Figure 4:
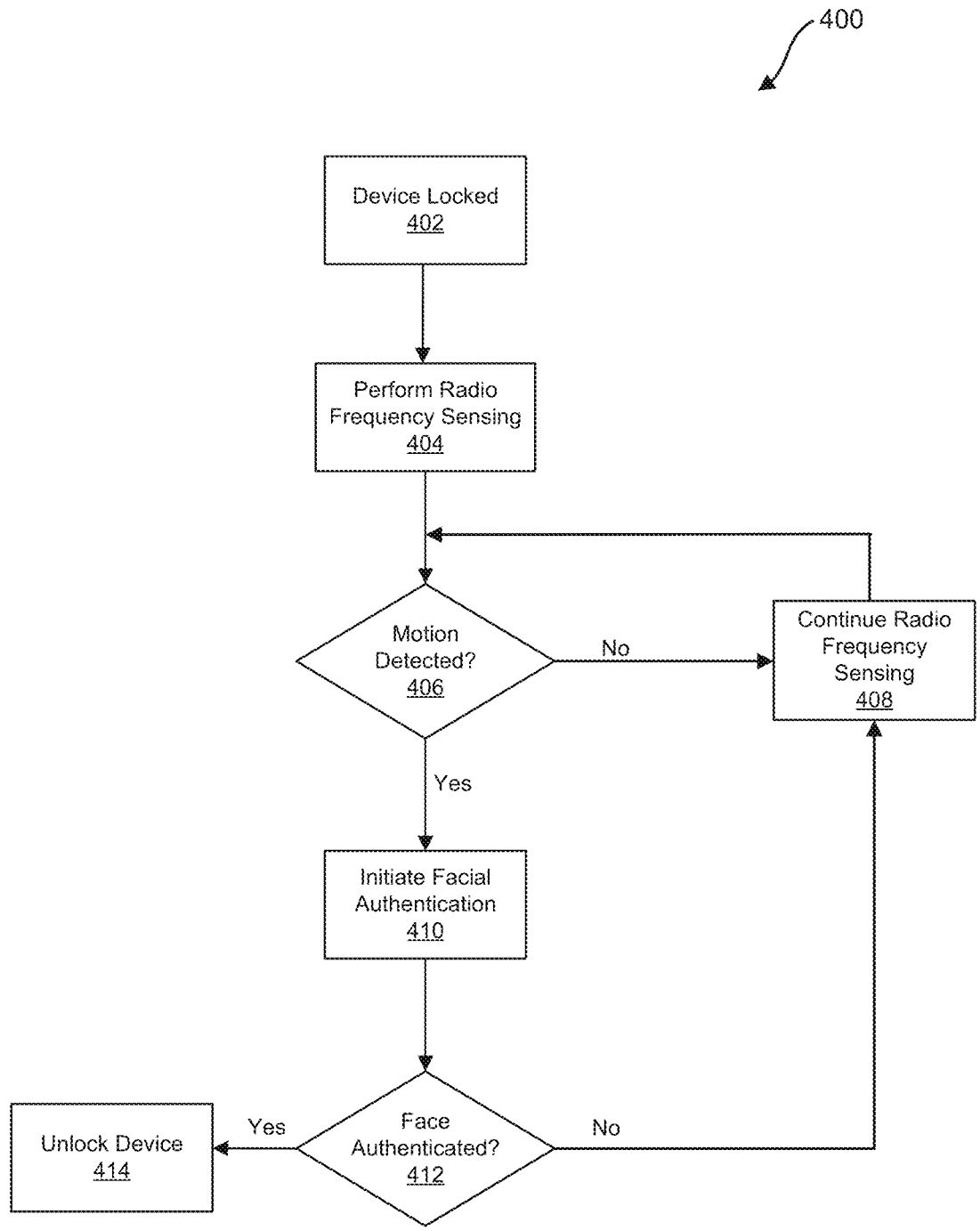
FIG. 4 is a flow diagram illustrating an example of a process for performing facial recognition, in accordance with some examples.

FIG. 4 is a flow diagram illustrating an example of a process 400 for performing facial recognition. Block 402 illustrates a state of the device where the device is locked and the screen (or display) of the device is off. For instance, a user may have set the device down on a desk and the device may have transitioned to a locked state after a certain amount of time of inactivity.

At block 404, the device can perform RF sensing in order to detect motion within a proximity of the device. In one example, RF sensing to detect motion can be implemented by configuring an RF interface on the device to perform simultaneous transmit and receive functions (similar to that described above, such as with respect to the wireless device 200 of FIG. 2). For instance, a Wi-Fi interface on the device can be configured to transmit one or more RF signals and simultaneously (or near simultaneously) receive one or more reflected signals that correspond to the transmitted RF signal.

In some implementations, the device can be configured to implement RF sensing algorithms having varying levels of RF sensing resolution based upon parameters such as the bandwidth of the transmitted RF signal, the number of spatial streams, the number of antennas configured to transmit an RF signal, the number of antennas configured to receive an RF signal, the number of spatial links (e.g., number of spatial streams multiplied by number of antennas configured to receive an RF signal), the sampling rate, or any combination thereof. For example, the device may implement an algorithm that can detect motion in the device's proximity when it is in a locked or sleep state by adjusting one or more parameters relating to bandwidth, sampling rate, and/or spatial links.

For example, in some cases, the device may be configured to transmit using spatial streaming or multiplexing techniques that can be used to transmit independent and separately coded signals (e.g., streams) from each of the transmit antennas. For instance, a wireless device having four antennas can be configured to implement a 1×3 configuration (e.g., one spatial stream and three RX antennas which will result in three spatial links) by configuring one antenna to transmit and configuring the remaining three antennas to receive (e.g., in which case the one TX antenna can transmit a spatial stream that can be received by the other three RX antennas). In another example, the wireless device may implement a 2×2 configuration (e.g., two spatial streams and two RX antennas which will result in four spatial links) by transmitting independent signals via two antennas that are configured to transmit, which can be received by two antennas that are configured to receive.

In some configurations, the device can adjust the level of RF sensing resolution by modifying the number of spatial links (e.g., adjusting number of spatial streams and/or number of receive antennas) as well as the bandwidth and the sampling frequency. In some cases, the device can implement a low-resolution RF sensing algorithm (e.g., with a relatively low bandwidth, low number of spatial links, and low sampling rate), which consumes a small amount of power and can operate in the background when the device is in the locked or sleep state. In one illustrative example, the device can perform motion detection by configuring an RF interface to utilize a single spatial link to transmit a signal having a bandwidth of approximately 20 MHz and by utilizing a sampling rate that can be in the range of 100 ms to 500 ms. Those skilled in the art will understand that the parameters and corresponding values set forth herein are provided as example configurations and that the disclosed systems and techniques may be implemented using different variations of parameters and values.

At block 406, the device can determine whether motion is detected based on the RF sensing data. The device may detect motion by utilizing signal processing, machine learning algorithms, using any other suitable technique, or any combination thereof. If no motion is detected, the process 400 can proceed to block 408 in which the device remains in a locked state and continues to perform RF sensing in order to detect motion. In such cases, the device can continue to perform RF sensing using the low-resolution RF sensing algorithm.

If motion is detected at block 406, the process 400 can proceed to block 410 and initiate facial authentication. In some examples, facial recognition can be performed by using an RF interface that is capable of transmitting extremely high frequency (EHF) signals or mmWave technology (e.g., IEEE 802.11ad), such as by transmitting signals in a direction that is perpendicular to the device screen. For example, the device can utilize the mmWave RF interface to perform narrow beam sweeping to obtain time of flight and phase measurements at different angles from the signals that are reflected from the user's face. In some examples, the device can utilize the time of flight and phase measurements to generate face signatures that it can compare with calibrated face metrics that are stored in the system for facial recognition.

In another example, the device may use light detection and ranging (LIDAR) to perform facial recognition. For instance, a LIDAR device can be used to illuminate the face of a user with laser light and measure the time the reflection of the laser light takes to return to a sensor. In some cases, the device can use differences in return times and/or wavelengths to generate a three dimensional representation or image of a face of a user, which can be used to perform facial recognition.

In another example, the device may use an infrared (IR) light source, dot projector, or other light source to illuminate a user's face and an IR camera or other image capture device to perform image capture. The captured image may then be processed and used to perform the facial authentication at block 410. For example, the capture image or captured image data may be compared with a stored/registered face or corresponding signature to perform authentication. If the process 400 determines at block 412 that facial authentication has failed, the process 400 can proceed to block 408 in which the device continues to perform RF sensing in order to detect motion. If facial authentication is verified at block 412, the process 400 can proceed to block 414 in which the device is unlocked.

Figure 5:
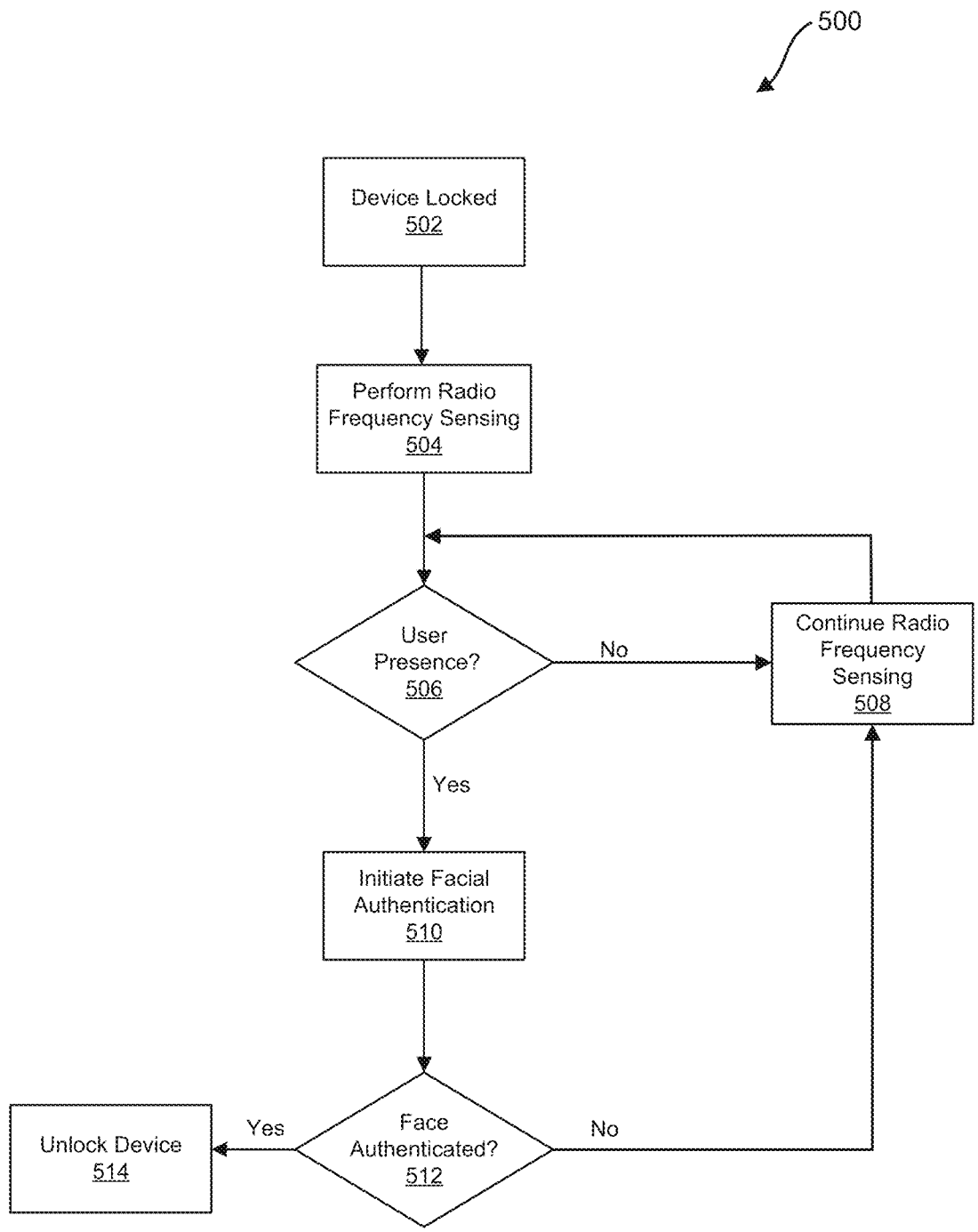
FIG. 5 is a flow diagram illustrating an example of a process for performing facial recognition, in accordance with some examples.

FIG. 5 is a flow diagram illustrating an example of a process 500 for performing facial recognition. Block 502 illustrates a state of the device where the device is locked and the screen (or display) of the device is off. For instance, a user may have set the device down on a desk and/or the device may have entered a locked state after a certain amount of time of inactivity.

At block 504, the device can perform RF sensing in order to detect the presence of a user within a proximity or a threshold distance of the device. In one example, detecting user presence can include detecting and identifying the presence of a user's head. In some implementations, RF sensing to detect user presence can be performed in response to detection of motion, as discussed with respect to process 400. For example, a device may implement RF sensing by using parameters (e.g., bandwidth, sampling rate, spatial streams, spatial links, any combination thereof, and/or other parameters) that provide low-power operation for detection of motion. In response to detecting motion, a device may implement RF sensing using a different set of parameters (e.g., a different bandwidth, a different sampling rate, different spatial streams, different spatial links, etc.) that can be configured for detecting user presence.

In one example, a device that is set on a desk in a room may use the techniques discussed with respect to process 400 to detect that a user is walking around the room, but is not yet in close proximity (e.g., within a threshold distance in which the user may operate the device) to the device. Upon detecting that the user is moving towards the device, the device may implement a different RF sensing algorithm (e.g., according to the process 500 of FIG. 5) that can be configured to detect user presence by detecting and identifying the user's head.

RF sensing to detect user presence can be implemented by configuring an RF interface on the device to perform simultaneous transmit and receive functions. For instance, an RF interface on the device can be configured to transmit one or more RF signals and simultaneously receive one or more reflected signals that correspond to the transmitted RF signal.

As noted above, in some implementations, the device can be configured to implement RF sensing algorithms having varying levels of RF sensing resolution based upon parameters such as the bandwidth of the transmitted RF signal, the number of spatial streams, the number of spatial links, the sampling rate, or any combination thereof. For example, the device may implement an algorithm that can detect user presence (e.g., by performing head detection to detect the presence of a head) when the device is in a locked or sleep state by adjusting one or more parameters relating to bandwidth, sampling rate, spatial streams, and/or spatial links. In some cases, the device can implement a mid-resolution RF sensing algorithm (e.g., with a medium bandwidth, a medium number of spatial links, and a medium sampling rate as compared to the low-resolution RF sensing algorithm), which can differ from the low-resolution RF sensing algorithm by having a higher bandwidth, a higher number of spatial links, a higher sampling rate, or any combination thereof. For instance, as compared to the parameters used in the process 400 of FIG. 4 to detect motion, the device can increase the bandwidth, increase the sampling rate (to collect more samples), and/or increase the number of spatial links to detect the user presence. In one illustrative example, the device can detect user presence (e.g., head detection) by configuring an RF interface to utilize two spatial links and transmit a signal having a bandwidth of approximately 40 MHz and by utilizing a sampling rate that can be approximately 50 ms. As discussed with respect to process 400, those skilled in the art will understand that the parameters and corresponding values set forth herein are provided as example configurations and that the disclosed systems and techniques may be implemented using different variations of parameters and values.

At block 506, the device can determine whether user presence is detected based on the RF sensing data. The device may detect user presence by utilizing signal processing, machine learning algorithms, using any other suitable technique, or any combination thereof. If user presence is not detected (e.g., no head detection), the process 500 can proceed to block 508 in which the device remains in a locked state and continues to perform RF sensing in order to detect user presence (e.g., presence of a head) using the process 500 of FIG. 5 or to detect motion using the process 400 of FIG. 4. In such cases, the device can continue to perform RF sensing using the mid-resolution RF sensing algorithm.

If user presence is detected at block 506, the process 500 can proceed to block 510 and initiate facial authentication. In some examples, facial authentication can be performed using RF sensing techniques, by using a device's IR camera to capture an image, by using a LIDAR sensor, or any combination thereof. Further details relating to facial authentication are set forth in the description of FIG. 8.

If facial authentication fails at block 512, the process 500 can proceed to block 508 in which the device continues to perform RF sensing in order to detect user presence. In some configurations, the process may alternatively perform RF sensing to detect motion, as discussed in connection with process 400. If facial authentication is verified at block 512, the process 500 can proceed to block 514 in which the device is unlocked.

Figure 6:
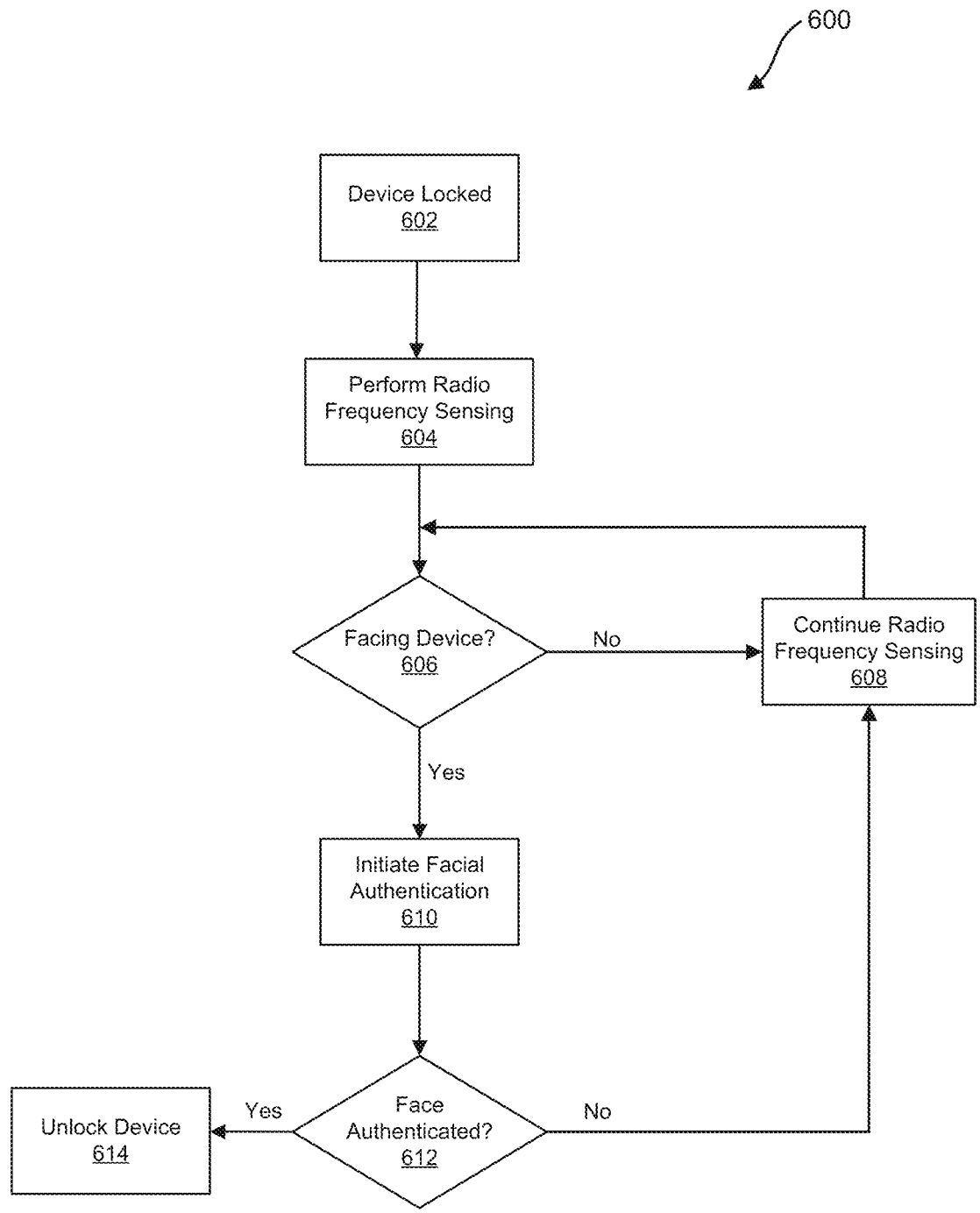
FIG. 6 is a flow diagram illustrating another example of a process for performing facial recognition, in accordance with some examples.

FIG. 6 is a flow diagram illustrating an example of a process 600 for performing facial recognition. Block 602 illustrates a state of the device where the device is locked and the screen (or display) of the device is off. Similar to the examples from FIG. 4 and FIG. 5, a user may have set the device down on a desk and/or the device may have entered a locked state after a certain amount of time of inactivity.

At block 604, the device can perform RF sensing in order to determine whether the user is facing the device (e.g., based on head orientation). In some implementations, RF sensing to determine a user's head orientation can be performed in response to detection of the user's head, as discussed with respect to process 500. For example, a device may implement RF sensing by using parameters (e.g., bandwidth, sampling rate, spatial streams, spatial links, any combination thereof, and/or other parameters) that are configured to detect user presence (e.g., head presence) while minimizing power consumption. In response to detecting user presence, a device may implement RF sensing using a different set of parameters (e.g., bandwidth, sampling rate, spatial streams, spatial links, any combination thereof, and/or other parameters) that can be configured for determining the head orientation of the user.

In one example, a device that is set on a desk in a room may use the techniques discussed with respect to the process 500 of FIG. 5 to determine that a user's head is in close proximity to the device. In some aspects, a user's head is in close proximity to the device if it is within a threshold distance of the device (e.g., within 2 feet). Presence of the user and detection of the head within the threshold distance may then trigger RF sensing techniques to determine the orientation of the user's head. For example, RF sensing may determine whether the user is facing the device or if the device is in the user's lap while his/her attention is directed elsewhere.

RF sensing to detect head orientation can be implemented by configuring an RF interface on the device to perform simultaneous transmit and receive functions. For instance, an RF interface on the device can be configured to transmit one or more RF signals and simultaneously receive one or more reflected signals that correspond to the transmitted RF signal.

Similar to that described above, the device can be configured to implement RF sensing algorithms having varying levels of RF sensing resolution based upon parameters such as the bandwidth of the transmitted RF signal, the number of spatial streams, the number of spatial links, the sampling rate, or any combination thereof. For example, the device may implement an algorithm that can detect a user's head orientation when it is in a locked or sleep state by adjusting one or more parameters relating to bandwidth, sampling rate, and/or spatial links. In some cases, the device can implement a high-resolution RF sensing algorithm (e.g., with a high bandwidth, a high number of spatial links, and a high sampling rate as compared to the mid-resolution RF sensing algorithm). The high-resolution RF sensing algorithm can differ from the mid-resolution RF sensing algorithm by having a higher bandwidth, a higher number of spatial links, a higher sampling rate, or any combination thereof. For instance, as compared to the parameters used in the process 500 of FIG. 5 to detect the presence of a head, the device can increase the bandwidth, increase the sampling rate (to collect more samples), and/or increase the number of spatial links to detect the head orientation. In one illustrative example, the device can detect head orientation by configuring an RF interface to utilize three or more spatial links, to transmit a signal having a bandwidth of 80-160 MHz, and by utilizing a sampling rate that is less than 50 ms. As discussed with respect to the foregoing processes, those skilled in the art will understand that the parameters and corresponding values set forth herein are provided as example configurations and that the disclosed systems and techniques may be implemented using different variations of parameters and values.

At block 606, the device can determine whether a user's head is directed towards the device based on the RF sensing data. The device may detect a user's head orientation by utilizing signal processing, machine learning algorithms, using any other suitable technique, or any combination thereof. If the device determines that the user's head orientation is not facing the device, the process 600 can proceed to block 608 in which the device remains in a locked state and continues to perform RF sensing in order to detect orientation of the head using the process 600 of FIG. 6, to detect user presence (e.g., presence of a head) using the process 500 of FIG. 5, or to detect motion using the process 400 of FIG. 4. In such cases, the device can continue to perform RF sensing using the high-resolution RF sensing algorithm.

In some examples, if the device determines that the user's head orientation is not facing the device at block 606, the device may determine that the user is facing in the direction of another device. In some aspects, the device can implement a positioning algorithm (e.g., round trip time (RTT) measurements, passive positioning, angle of arrival, received signal strength indicator (RSSI), CSI data, using any other suitable technique, or any combination thereof) or the device may access position data (e.g., previously stored position data or position data from a server) to determine a range or distance to other devices. In some cases, the device can use the position data together with device orientation data (e.g., from a gyroscope) to determine that the user's head orientation is directed to another device. In one illustrative example, the device can determine that the user is facing a television and the device may communicate with the television to cause it to turn on.

If the device determines that a user's head orientation is directed towards the device at block 606, the process 600 can proceed to block 610 and initiate facial authentication. In some examples, facial authentication can be performed using RF sensing techniques, by using a device's IR camera to capture an image, by using a LIDAR sensor, or any combination thereof. Further details relating to facial authentication are set forth in the description of FIG. 8.

If facial authentication fails at block 612, the process 600 can proceed to block 608 in which the device continues to perform RF sensing in order to detect a user's head orientation. In some configurations, the process may alternatively perform RF sensing to detect motion or user presence, as discussed in connection with process 400 and process 500, respectively. If facial authentication is verified at block 612, the process 600 can proceed to block 614 in which the device is unlocked.

Figure 7:
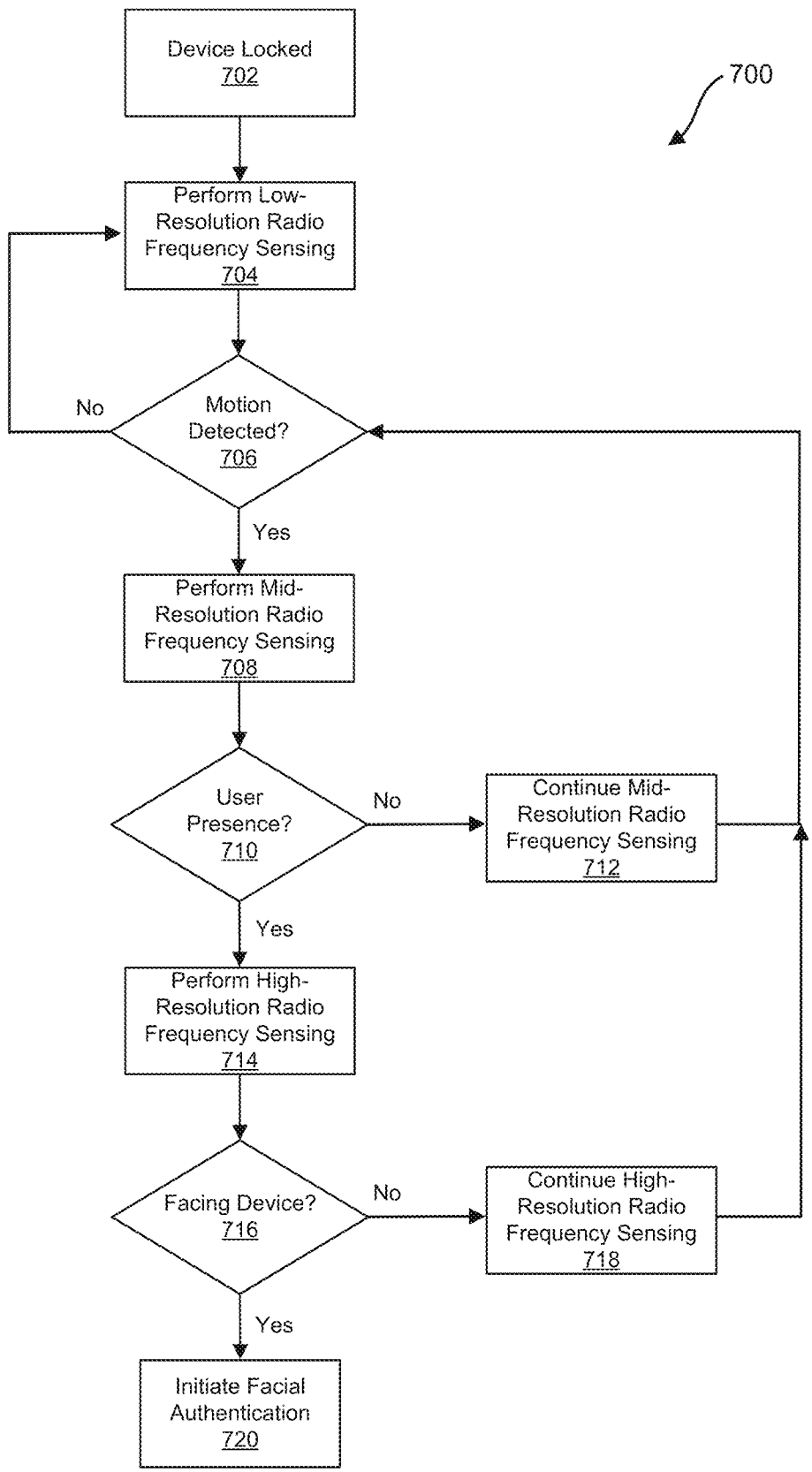
FIG. 7 is a flow diagram illustrating another example of a process for performing facial recognition, in accordance with some examples.

FIG. 7 is a flow diagram illustrating an example of a process 700 for performing facial recognition. Block 702 illustrates a state of the device where the device is locked and the screen (or display) of the device is off. Similar to the examples from FIG. 4, FIG. 5, and FIG. 6, a user may have set the device down on a desk and/or the device may have entered a locked state after a certain amount of time of inactivity.

At block 704, the device can perform a low-resolution RF sensing algorithm in order to detect motion within a proximity of the device (e.g., detect a user walking in the same room as the device). In one example, RF sensing to detect motion can be implemented by configuring an RF interface on the device to perform simultaneous transmit and receive functions (similar to that described above, such as with respect to the wireless device 200 of FIG. 2). For instance, a Wi-Fi interface on the device can be configured to transmit one or more RF signals and simultaneously (or near simultaneously) receive one or more reflected signals that correspond to the transmitted RF signal. In one illustrative example, the low-resolution RF sensing algorithm can be implemented by configuring an RF interface to utilize a single spatial link to transmit a signal having a bandwidth of approximately 20 MHz and by utilizing a sampling rate that can be in the range of 100 ms to 500 ms.

At block 706, the device can determine whether motion is detected based on the RF sensing data. If no motion is detected, the process 700 can return to block 704 in which the device remains in a locked state and continues to perform low-resolution RF sensing in order to detect motion.

If motion is detected at block 706, the process 700 can proceed to block 708 and the device can perform a mid-resolution RF sensing algorithm in order to detect the presence of a user within a proximity or a threshold distance of the device. In one example, detecting user presence can include detecting and identifying the presence of a user's head. The mid-resolution RF sensing algorithm can differ from the low-resolution RF sensing algorithm by having a higher bandwidth, a higher number of spatial links, a higher sampling rate, or any combination thereof. In one illustrative example, the device can detect user presence (e.g., head detection) by configuring an RF interface to utilize two spatial links and transmit a signal having a bandwidth of approximately 40 MHz and by utilizing a sampling rate that can be approximately 50 ms.

At block 710, the device can determine whether user presence is detected based on the RF sensing data. If user presence is not detected, the process 700 can continue to implement a mid-resolution RF sensing algorithm at block 712. In some examples, the mid-resolution RF sensing algorithm can be used to detect motion at block 706. If no motion is detected, the process 700 can return to block 704 in which the device remains in a locked state and continues to perform low-resolution RF sensing in order to detect motion.

If user presence is detected at block 710, the process 700 can proceed to block 714 and the device can perform a high-resolution RF sensing algorithm in order to determine whether the user is facing the device (e.g., based on head orientation). The high-resolution RF sensing algorithm can differ from the mid-resolution RF sensing algorithm by having a higher bandwidth, a higher number of spatial links, a higher sampling rate, or any combination thereof. In one illustrative example, the device can detect head orientation by configuring an RF interface to utilize three or more spatial links, to transmit a signal having a bandwidth of 80-160 MHz, and by utilizing a sampling rate that is less than 50 ms.

At block 716, the device can determine whether the user is facing the device based on the RF sensing data. If the user is not facing the device, the process 700 can continue to implement a high-resolution RF sensing algorithm at block 718. In some examples, the high-resolution RF sensing algorithm can be used to detect motion at block 706. If no motion is detected, the process 700 can return to block 704 in which the device remains in a locked state and continues to perform low-resolution RF sensing in order to detect motion. If the device determines that a user's head orientation is directed towards the device at block 716, the process 700 can proceed to block 720 and initiate facial authentication.

Figure 8:
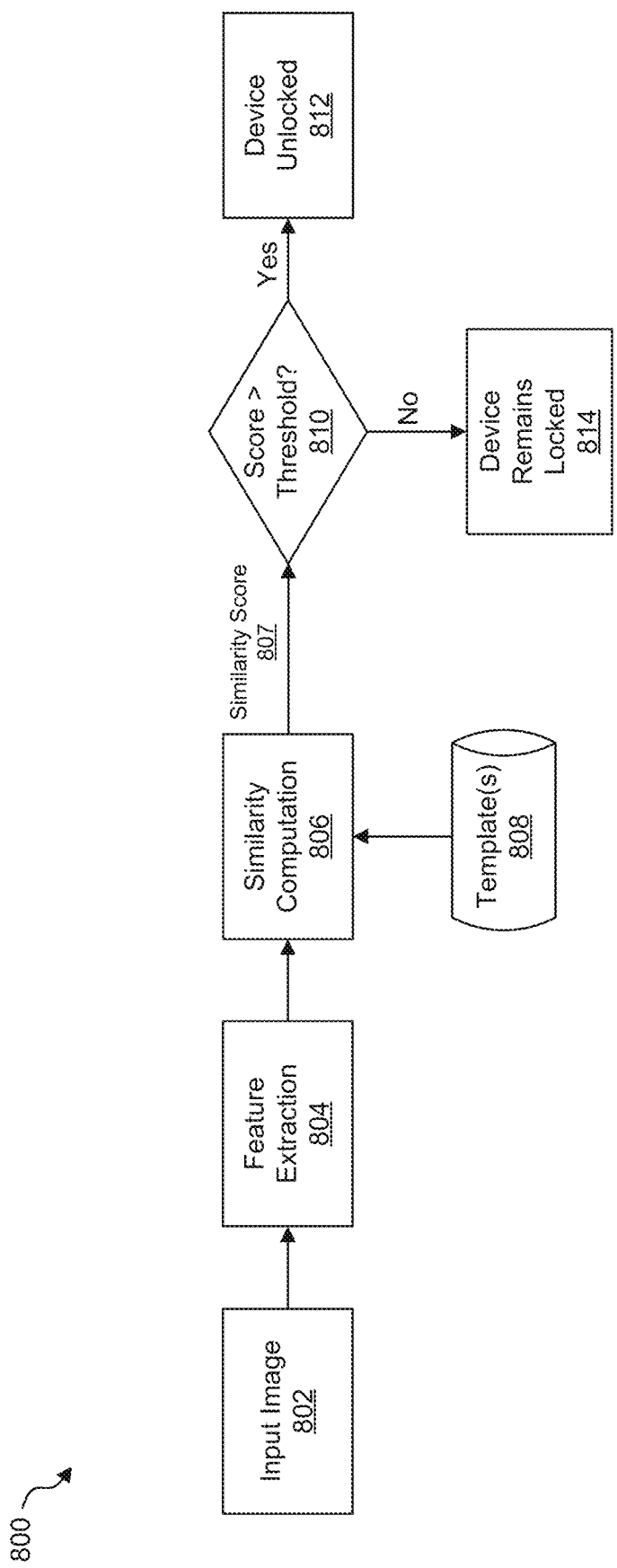
FIG. 8 is a flow diagram illustrating another example of a process for performing facial recognition, in accordance with some examples.

FIG. 8 is a flowchart illustrating an example of a general authentication process 800 using a face as biometric data. An input image 802 of a user attempting to access a device is obtained. For example, the input image 802 can be an image that is compiled utilizing RF sensing techniques. In one example, a device may utilize an RF interface that is capable of transmitting extremely high frequency (EHF) signals or mmWave technology (e.g., IEEE 802.11ad) to transmit signals in a direction that is perpendicular to the device screen. For example, the device can utilize the mmWave RF interface to perform narrow beam sweeping to obtain time of flight and phase measurements at different angles from the signals that are reflected from the user's face. In some examples, the device can utilize the time of flight and phase measurements to generate face signatures that it can compare with calibrated face metrics that are stored in the system for facial recognition. In another example, input image 802 can be obtained by a camera (e.g., input devices 172) of the wireless device. In another example, input image 802 can be obtained by using a LIDAR sensor (e.g., communications interface 1240) of the wireless device.

At block 804, the input image 802 is processed for feature extraction. For example, at block 804, a feature representation including one or more features of the face can be extracted from the input image 802 containing the face. The feature representation of the face can be compared to a face representation (e.g., stored as a template in template storage 808) of a person authorized to access the device. In some examples, the template storage 808 can include a database. In some examples, the template storage 808 is part of the same device that is performing facial authentication (e.g., user device 107, wireless device 200, or other device). In some examples, the template storage 808 can be located remotely from the device (e.g., wireless device 200) performing facial authentication (e.g., at a remote server that is in communication with the device).

The templates in the template storage 808 can be generated during an enrollment step, when a person is registering their biometric features for later use during authentication. Each template can be linked internally (e.g., in the template storage 808) to a subject identifier (ID) that is unique to the person being registered. For example, during enrollment (which can also be referred to as registration), an owner of the computing device and/or other user with access to the computing device can input one or more biometric data samples (e.g., an image, a fingerprint sample, a voice sample, or other biometric data). Representative features of the biometric data can be extracted by the feature extraction engine. The representative features of the biometric data can be stored as one or more templates in the template storage 808. For instance, several images can be captured of the owner or user with different poses, positions, facial expressions, lighting conditions, and/or other characteristics.

In another example, several different facial signatures can be captured by using RF sensing techniques. Facial features of the different images or signatures can be extracted and saved as templates. For instance, a template can be stored for each image/signature, with each template representing the features of each face with its unique pose, position, facial expression, lighting condition, etc. The one or more templates stored in the template storage 808 can be used as a reference point for performing facial authentication.

As noted above, at block 804, one or more features of the face can be extracted from the input image 802. Any suitable feature extraction technique can be used to extract features from the biometric data (during registration and during the authentication). One illustrative example of a feature extraction process that can generate deep learning features is neural network (e.g., using a deep learning network) based feature extraction. For example, a neural network can be trained using multiple training images to learn distinctive features of various face. In one configuration, the neural network can be trained using RF sensing data corresponding to features associated with the RF face signature. Once trained, the trained neural network can then be applied to the input image 802 including the face. The trained neural network can extract or determine distinctive features of the face. The neural network can be a classification network including hidden convolutional layers that apply kernels (also referred to as filters) to the input image to extract features.

At block 806, a similarity can be computed between the feature representation of the user extracted from the input image 802 and a feature representation of the face of the person stored in a template storage 808. For example, a representation of the features extracted from the input image 802 can be compared to the one or more templates stored in the template storage 808. For example, at block 806, the process 800 can perform a similarity computation to compute the similarity between the input image 802 and the one or more templates in the template storage 808. The computed similarity can be used as the similarity score 807 that will be used to make the final authentication decision.

In some cases, the data of the input image 802 can also be referred to as query data (e.g., a query face). In some cases, the templates can also be referred to as enrolled data (e.g., an enrolled face). As noted above, in some examples, the features extracted for a face (or other object or biometric feature) can be represented using a feature vector that represents the face (or other object or biometric feature). For instance, each template can be a feature vector. The representation of the features extracted from the input biometric data can also be a feature vector. Each feature vector can include a number of values representing the extracted features. The values of a feature vector can include any suitable values. In some cases, the values of a feature vector can be floating numbers between −1 and 1, which are normalized feature vector values. The feature vector representing the features of the face from the input image 802 can be compared or matched with the one or more feature vectors of the one or more templates to determine a similarity between the feature vectors. For example, a similarity can be determined between the feature vector representing the face in the input image 802 and the feature vector of each template, resulting in multiple similarity values.

In some implementations, a similarity between features of an enrolled face of a template (from the template storage 808) and features of a query face (of the input image 802) can be measured with distance. Any suitable distance can be used, including Cosine distance, Euclidean distance, Manhattan distance, Mahalanobis distance, absolute difference, Hadamard product, polynomial maps, element-wise multiplication, and/or other suitable distance. In one illustrative example, a similarity between two faces can be computed as the sum of similarities of the two face patches. In some cases, the sum of similarities can be based on a Sum of Absolute Differences (SAD) between the query face (of the input image 802) and an enrolled face of a template (from the template storage 808).

One method to represent similarity is to use similarity scores (also referred to as matching scores). A similarity score represents the similarity between features (indicating how well the features match), where a higher score between two feature vectors indicates that the two feature vectors are more similar than a lower score between two feature vectors. Referring to FIG. 8, the similarity score 807 indicates a similarity between the features of one or more of the stored templates and the facial features extracted from the input image 802. A device can compare the similarity score 807 to one or more thresholds. In some cases, a similarity score can be determined between the query face (of the input image 802) and each enrolled face (corresponding to each template). The highest similarity score (corresponding to the best match) can be used as the similarity score 807.

In some examples, a similarity score can be generated based on a computed distance between the facial features extracted from the input image 802 and template data, or based on any other comparison metric. As previously described, a distance can include a Cosine distance, Euclidean distance, Manhattan distance, Mahalanobis distance, absolute difference, Hadamard product, polynomial maps, element-wise multiplication, and/or other suitable distance. As noted above, a feature vector for a face can be generated based on the feature extraction performed by the feature extraction engine. A similarity score between the face in the input image 802 and the template data can be computed based on a distance between a feature vector representing the face and a feature vector representing the template data. The computed distance represents the difference between data values of the feature vector representing the face in the input image 802 and data values of the feature vector representing the template data. For instance, a cosine distance measures the cosine of the angle between two non-zero vectors of an inner product space. The cosine similarity represents a measure of similarity between the two non-zero vectors.

In some cases, a computed distance (e.g., Cosine distance, Euclidean distance, and/or other distance) can be normalized to a value of 0 or a value of 1. As one example, the similarity score can be defined as 1000*(1−distance). In some cases, the similarity score can be a value between 0 and 1.

As noted above, the similarity score 807 can be used to make the final authentication decision. For example, at block 810, the similarity score 807 can be compared to a similarity threshold. In some examples, the similarity threshold can include a percentage of similarity (e.g., 75%, 80%, 85%, etc. of the features are similar). If the similarity score 807 is greater than the similarity threshold, the device is unlocked at block 812. However, if the similarity score 807 is not greater than the threshold, the device remains locked at block 814.

In some aspects, the authentication process 800 can be implemented with two or more similarity thresholds. For instance, the device can be unlocked at block 812 if similarity score 807 is greater than a "high" threshold. In another example, the device can remain locked if similarity score 807 is less than a "low" threshold. In some cases, a user may be presented with an alternative unlock mechanism (e.g., fingerprint scan, access code, etc.) if similarity score 807 is less than a "low" threshold. In some examples, a similarity score 807 that is less than a "high" threshold (e.g., between a "high" and a "low" threshold) may cause the device to prompt the user to perform a new facial scan (e.g., using RF sensing techniques as described herein).

In some implementations, devices (e.g., mobile devices such as phones) utilizing facial authentication implement an unlock timeout period. An unlock timeout period is a period of inactivity on the device (when unlocked), after which the device is automatically locked and a new facial authentication will need to be performed to unlock the device. In some examples, such devices may also implement a separate screen timeout period. A screen timeout period is a period of inactivity on the device (when the screen or display of the device is active or "on") after which the screen or display of the device is automatically turned off (e.g., the screen or display is powered off). The device may continue to remain unlocked when the screen or display is turned off.

Figure 9:
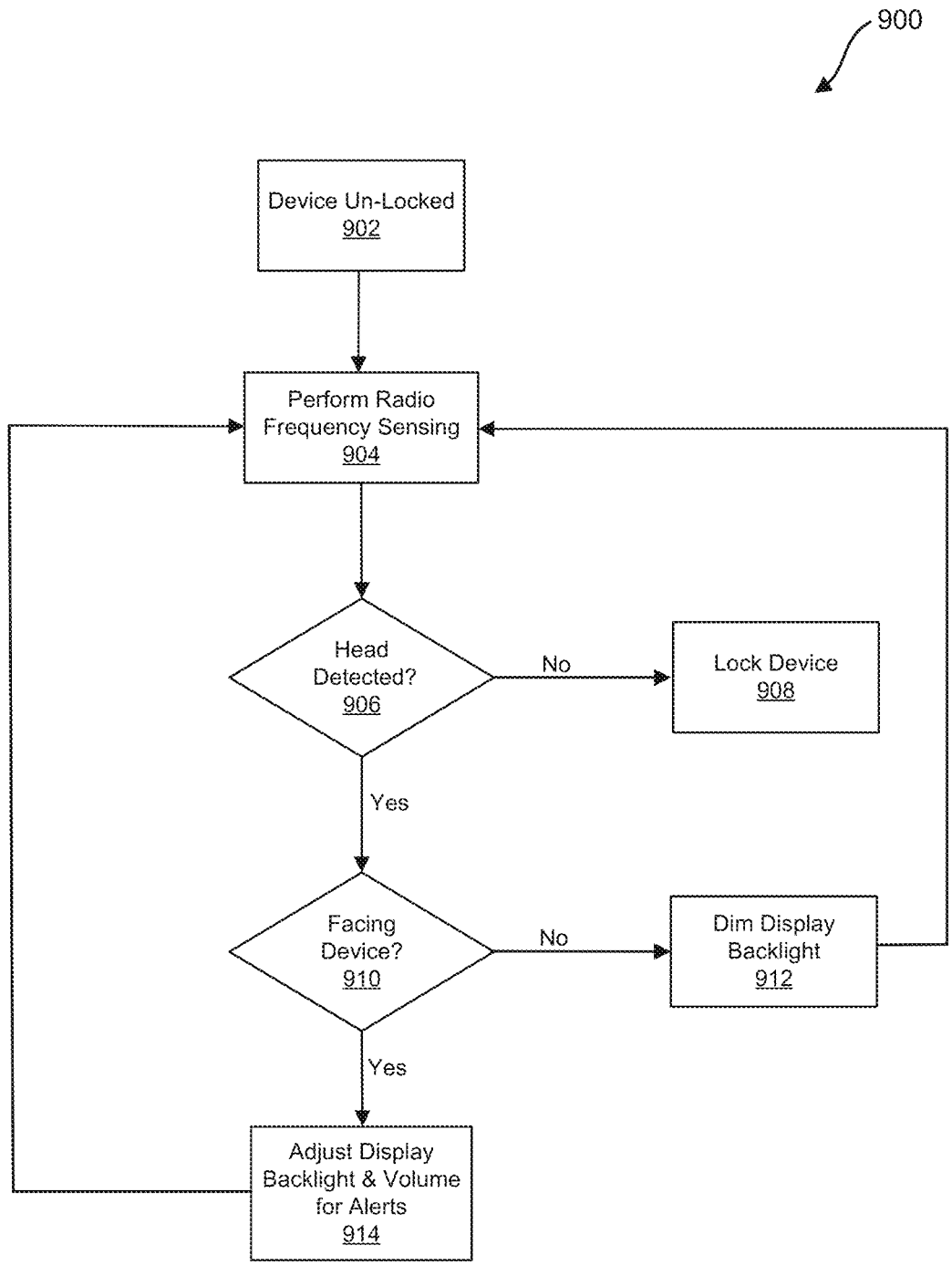
FIG. 9 is a flow diagram illustrating an example of a process for performing device management based on a user's attention, in accordance with some examples.

FIG. 9 is a flow diagram illustrating an example of a process 900 for performing device management based on a user's attention. Block 902 illustrates a state of the device where the device is un-locked and the screen (or display) of the device is on. For instance, a user may have provided authentication information (e.g., facial authentication, fingerprint authentication, access code, etc.) to gain access to the device and subsequently commenced using the device.

At block 904, the device can perform RF sensing in order to determine whether the user's attention is still directed towards the device. For example, the device may be configured to perform one or more operations associated with RF sensing as described in connection with process 500 for determining user presence (e.g., head detection) and/or one or more operations associated with RF sensing as described in connection with process 600 for determining user head orientation. In some cases, the device can be configured to perform one or more operations associated with RF sensing as described in connection with process 400 for determining motion (e.g., prior to performing the operations of process 500).

At block 906, the device can use RF sensing data to determine whether a user head is detected. If no head is detected, the device may determine that the user is no longer using the device and may proceed to block 908 in which the device is locked. In some configurations, the device may implement a timer before proceeding to block 908. For example, if a user head is not detected for a period time (e.g., 2 minutes), the device may determine that the user is no longer present and may lock access to the device.

At block 906, if the device determines that a user is present (e.g., the head is detected), the process may proceed to block 910 to determine a user's head orientation. For example, a user may be holding the device but engaged in conversation with another person such that the user's face is not facing the device. In this instance, the process may proceed to block 912 and dim the display backlight in order to save power and/or battery life. In some configurations, the device may proceed to block 912 after a time period of inattention has elapsed (e.g., the user's head orientation has been away for 2 minutes).

At block 910, if the device determines that a user is facing the device, the process may proceed to block 914 and adjust one or more settings on the device. For example, the device may detect that the display backlight was previously dimmed (e.g., at block 912) and should be increased because the user's attention is now directed towards the device. In another example, the device may adjust the volume of alerts (e.g., decrease alert volume) in response to determining that a user's attention is directed towards the device. For instance, the device ring volume may be decreased in response to determining that the user is viewing the device screen. After making adjustments to device settings, the process may return to block 904 and continue to perform RF sensing to determine the user's attention.

Figure 10:
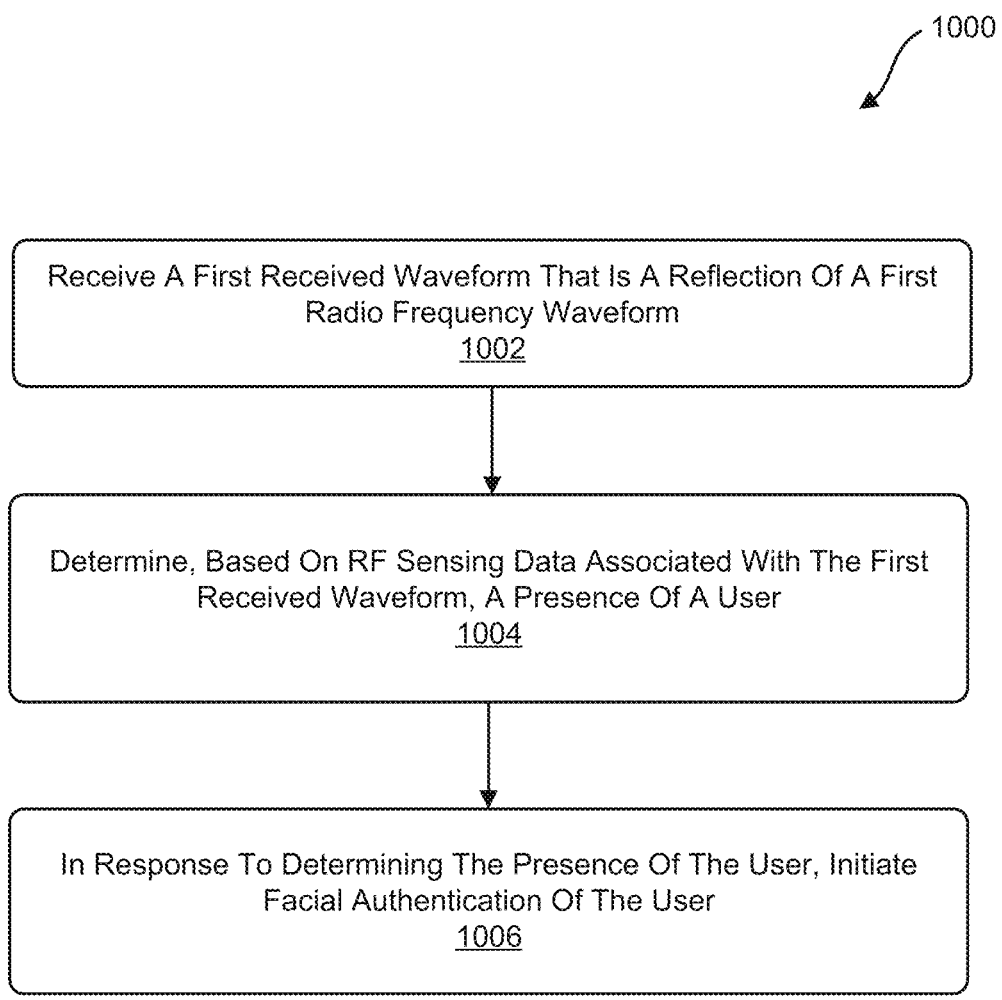
FIG. 10 is a flow diagram illustrating another example of a process for performing facial recognition, in accordance with some examples.

FIG. 10 is a flow diagram illustrating an example of a process 1000 for performing facial recognition. At operation 1002, the process 1000 includes receiving, by a first wireless device, a first received waveform that is a reflection of a first RF waveform. In some examples, the first RF waveform is transmitted by the same device (by the first wireless device) that receives the first received waveform (e.g., a monostatic configuration). In other examples, a bistatic configuration can be implemented in which the first RF waveform can be transmitted by another wireless device (e.g., a second wireless device) such as an access point or any other type of wireless device having an RF interface. In some examples, the first RF waveform can include a Wi-Fi signal that is transmitted by an omnidirectional antenna of or on the first wireless device.

At operation 1004, the process 1000 includes determining, based on RF sensing data associated with the first received waveform, a presence of a user. In some examples, the RF sensing data can include CSI data corresponding to reflections received in response to transmission of the first RF waveform. In other examples, the RF sensing data can include data associated with at least one received leakage signal that does not reflect from any objects and corresponds to the first RF waveform. The RF sensing data can be used to detect a presence of the user, which can include detecting movement of the user, detecting presence of the user (e.g., head presence), detecting the head orientation of the user, or any combination thereof. In some examples, detecting a presence of a user can include tracking a movement of the user and determining that the user is within a threshold distance to the wireless device.

In some aspects, the presence of the user can be detected by using the RF sensing data to determine the distance and angle of arrival of reflected signals. In some examples, the determination of the distance can be based on the time of flight of the reflected signal that is adjusted based on the propagation delay of the direct path (e.g., leakage signal between the transmitting antenna and the receiving antenna). In some examples, the angle of arrival can be based on the differences in signal phase measured at each element of a receiver antenna array.

In some aspects, the first wireless device may transmit a second RF waveform having a higher bandwidth than the first RF waveform. The first wireless device can receive a second received waveform that is a reflection of the second RF waveform from the user and determine, based on RF sensing data associated with the second received waveform, at least one of a head presence of the user or a head orientation of the user. In some examples, the second RF waveform may also include a different number of spatial links than the first RF waveform.

In some examples, user head presence and user head orientation can be used to initiate further activity on the first wireless device and/or other wireless device. For instance, a determination that a head of a user is not present (e.g., head presence is detected as false) for a predetermined amount of time can result in locking access to the wireless device. In another example, a determination that the head orientation of the user is facing away for a predetermined amount of time can result in dimming of a display backlight on the first wireless device.

At operation 1006, the process 1000 includes initiating facial authentication of the user in response to determining the presence of the user. As noted above, presence of the user may correspond to a movement of the user, a presence of the user (e.g., head detection), a head orientation of the user, or any combination thereof. In some examples, facial authentication may be performed by configuring an RF interface on the first wireless device to transmit one or more extremely high frequency (EHF) waveforms (e.g., a plurality of EHF waveforms). The first wireless device can receive a plurality of reflected waveforms corresponding to the one or more EHF waveforms. RF sensing data corresponding to the received reflections corresponding to the EHF waveforms can be used to generate a facial signature (associated with the user) that can be used to perform facial authentication. In some cases, initiating facial authentication of the user can include capturing an image of a face of the user using an infrared camera.

In some aspects, the first wireless device can determine, based on the facial authentication, that the user is authorized to access the first wireless device. For example, the first wireless device may calculate a similarity score (e.g., similarity score 807) and determine that the similarity score meets or exceeds a similarity threshold for providing access to the first wireless device. In some examples, the first wireless device may enable access to the first wireless device in response to determining that the user is authorized to access the first wireless device (e.g., based on the facial authentication).

In some cases, the first wireless device can determine, based on the facial authentication, that the user is authorized to access one or more other wireless devices. In some aspects, the first wireless device may enable access to at least one wireless device from the one or more wireless devices in response to determining that the user is authorized to access the one or more other wireless devices. In one illustrative example, the first wireless device can correspond to a mobile device (e.g. smart phone or tablet) and the at least one wireless device from the one or more wireless devices can correspond to a vehicle, which can be unlocked, started, enabled, or otherwise accessed based on the user authenticating with the first wireless device. In another illustrative example, the first wireless device can correspond to a mobile device (e.g., smart phone or tablet) and the at least one wireless device from the one or more wireless devices can correspond to an Internet of Things (IoT) device that can be configured to provide access to a home (e.g., unlock a door or open a garage door).

Figure 11:
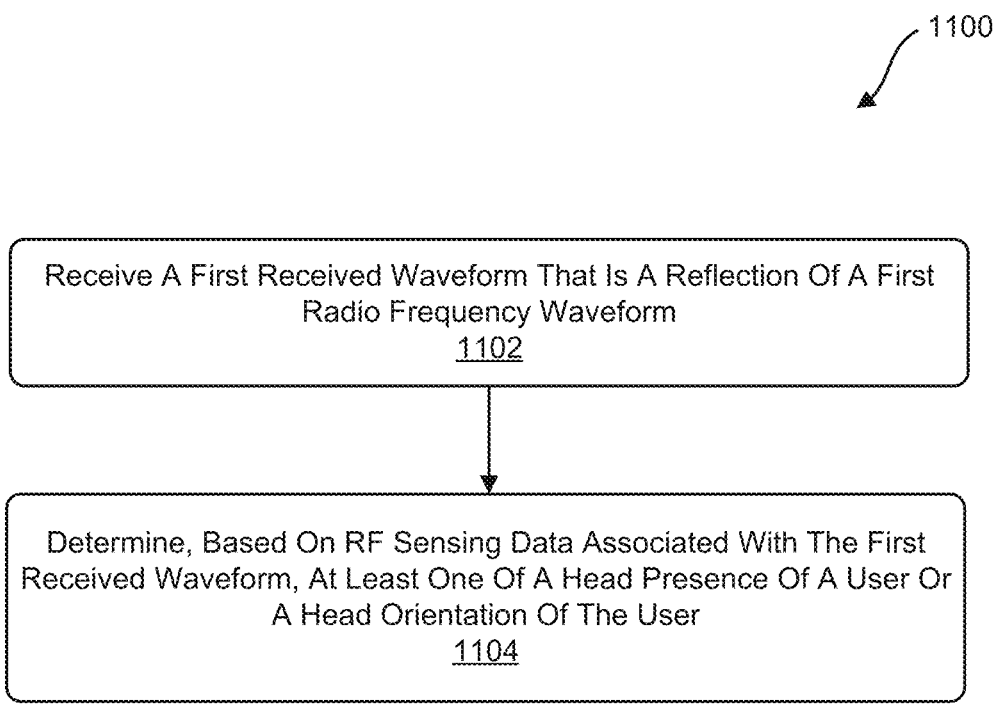
FIG. 11 is a flow diagram illustrating an example of a process for performing head detection, in accordance with some examples.

FIG. 11 is a flow diagram illustrating an example of a process 1100 for performing head detection. At operation 1102, the process 1100 includes receiving, by a wireless device, a first received waveform that is a reflection of a first RF waveform. In some examples, the first RF waveform is transmitted by the same device (by the wireless device) that receives the first received waveform (e.g., a monostatic configuration). In other examples, a bistatic configuration can be implemented in which the first RF waveform can be transmitted by another wireless device such as an access point or any other type of wireless device having an RF interface. In some examples, the first RF waveform can include a Wi-Fi signal that is transmitted by an omnidirectional antenna of or on the first wireless device.

At operation 1104, the process 1100 includes determining, based on RF sensing data associated with the first received waveform, at least one of a head presence of a user or a head orientation of the user. In some examples, the RF sensing data can include CSI data corresponding to reflections received in response to transmission of the first RF waveform. In other examples, the RF sensing data can include data associated with at least one received leakage signal that does not reflect from any objects and corresponds to the first RF waveform. In some aspects, determining a head presence of a user can include determining that the head of the user is within a threshold distance of the wireless device. In some cases, determining a head orientation of a user can include determining that a user is facing the wireless device for a predetermined amount of time.

In some examples, the wireless device can implement one or more different RF sensing algorithms to determine or detect a head presence and/or a head orientation of a user. In some cases, RF sensing algorithms can have varying levels of resolution and/or power consumption. In some instances, the resolution and/or power consumption of an RF sensing algorithm can be based on the bandwidth, the number of spatial links, the sampling rate, or any combination thereof. In some aspects, the wireless device may initiate facial authentication if it determines that a head orientation of the user is facing the device. In further examples, the wireless device may determine that a head orientation of the user is facing a different device. The wireless device may use device location data, device orientation data, indoor mapping data, or any other suitable data to identify other devices that are in the vicinity of the user. In some cases, the wireless device can communicate with other devices based on the determination of user presence and/or user head orientation. For example, if the wireless device determines that the user is facing and/or near the television, the wireless device may send a signal to enable the television to turn on.

In some examples, the processes described herein (e.g., processes 400, 500, 600, 700, 800, 900, 1000 and/or other process described herein) may be performed by a computing device or apparatus (e.g., a UE). In one example, the process 1000 can be performed by the user device 107 of FIG. 1. In another example, the process 1000 can be performed by a computing device with the computing system 1200 shown in FIG. 12. For instance, a computing device with the computing architecture shown in FIG. 12 can include the components of the user device 107 of FIG. 1 and can implement the operations of FIG. 10.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1000 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
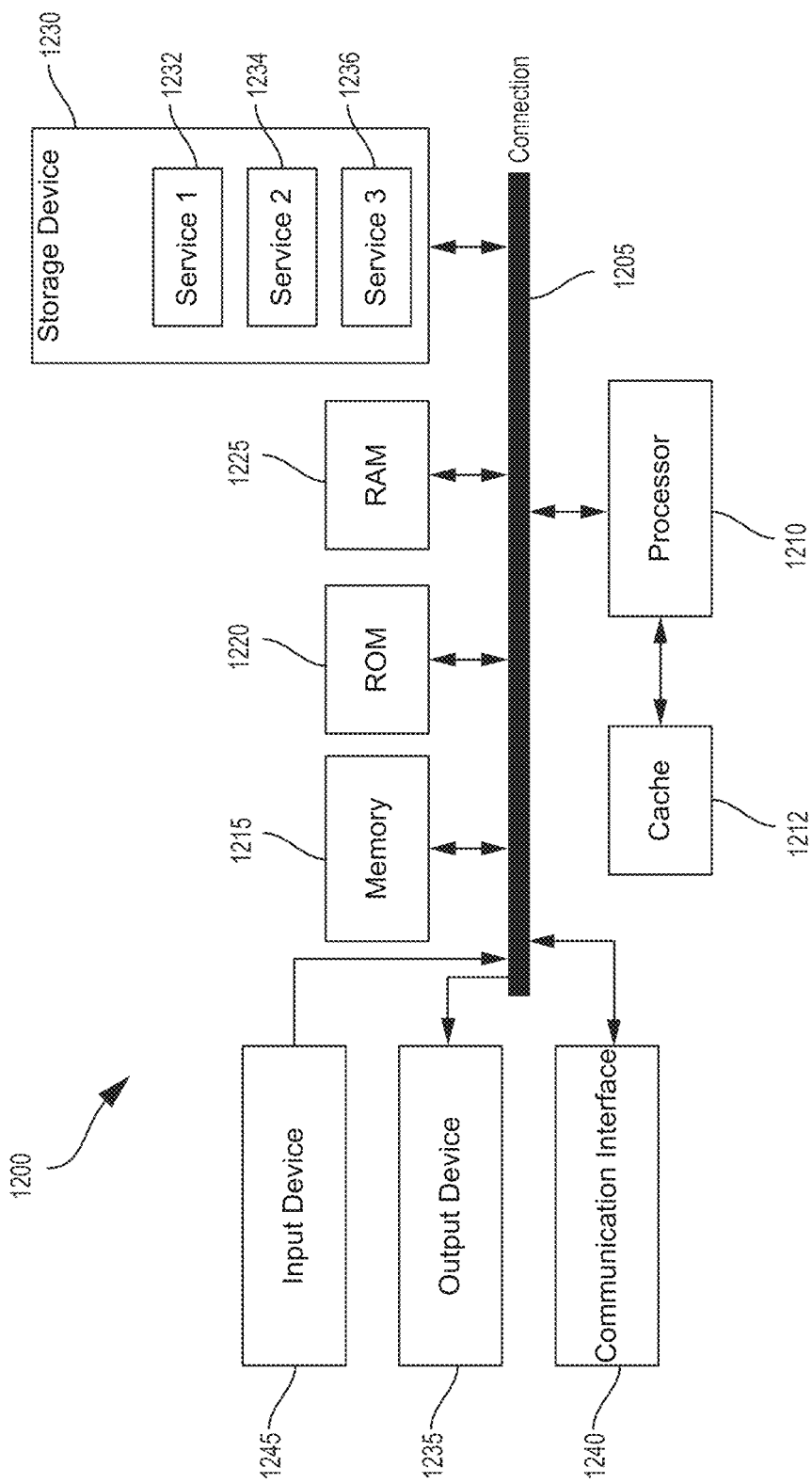
FIG. 12 is a block diagram illustrating an example of a computing system, in accordance with some examples.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that communicatively couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200.

Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1240 may also include one or more range sensors (e.g., light detection and ranging (LIDAR) sensors, laser range finders, radars, ultrasonic sensors, and infrared (IR) sensors) configured to collect data and provide measurements to processor 1210, whereby processor 1210 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A first wireless device for facial recognition. The first wireless device includes at least one transceiver; at least one memory; and at least one processor coupled to the at least one transceiver and the at least one memory. The at least one processor is configured to: receive, via the at least one transceiver, a first received waveform that is a reflection of a first radio frequency (RF) waveform; determine, based on RF sensing data associated with the first received waveform, a presence of a user; and in response to determining the presence of the user, initiate facial authentication of the user.

Aspect 2: The first wireless device according to aspect 1, wherein the at least one processor is configured to: transmit, via the at least one transceiver, a second RF waveform having a higher bandwidth than the first RF waveform; receive, via the at least one transceiver, a second received waveform that is a reflection of the second RF waveform from the user; and determine, based on RF sensing data associated with the second received waveform, at least one of a head presence of the user or a head orientation of the user.

Aspect 3: The first wireless device according to any one of aspects 1 or 2, wherein the at least one processor is configured to: in response to determining that the head orientation of the user is facing away for a predetermined time, dim a display backlight on the first wireless device.

Aspect 4: The first wireless device according to any one of aspects 1 to 3, wherein the at least one processor is configured to: in response to determining that the head presence of the user is false for a predetermined time, lock access to the first wireless device.

Aspect 5: The first wireless device according to any one of aspects 1 to 4, wherein the first RF waveform comprises a Wi-Fi signal that is transmitted by an omnidirectional antenna on the first wireless device.

Aspect 6: The first wireless device according to any one of aspects 1 to 5, wherein the first RF waveform is transmitted by a second wireless device.

Aspect 7: The first wireless device according to any one of aspects 1 to 6, wherein the RF sensing data comprises channel state information (CSI) data.

Aspect 8: The first wireless device according to any one of aspects 1 to 7, wherein, to determine the presence of the user, the at least one processor is configured to: track a movement of the user; and determine that the user is within a threshold distance to the first wireless device.

Aspect 9: The first wireless device according to any one of aspects 1 to 8, wherein, to initiate facial authentication of the user, the at least one processor is configured to: transmit, via the at least one transceiver, a plurality of extremely high frequency (EHF) waveforms; receive, via the at least one transceiver, a plurality of reflected waveforms corresponding to the plurality of EHF waveforms; and generate, based on RF sensing data associated with the plurality of reflected waveforms, a facial signature associated with the user.

Aspect 10: The first wireless device according to any one of aspects 1 to 9 further comprising a camera, wherein, to initiate facial authentication of the user, the at least one processor is configured to: capture at least one image of a face of the user using the camera.

Aspect 11: The first wireless device according to any one of aspects 1 to 10, wherein the RF sensing data comprises data associated with at least one received leakage signal that does not reflect from any objects and corresponds to the first RF waveform.

Aspect 12: The first wireless device according to any one of aspects 1 to 11, wherein the at least one processor is configured to: determine, based on the facial authentication, that the user is authorized to access the first wireless device; and in response to determining that the user is authorized to access the first wireless device, enable access to the first wireless device.

Aspect 13: The first wireless device according to any one of aspects 1 to 12, wherein the at least one processor is configured to: determine, based on the facial authentication, that the user is authorized to access one or more other wireless devices; and in response to determining that the user is authorized to access the one or more other wireless devices, enable access to at least one wireless device from the one or more other wireless devices.

Aspect 14: A method of performing facial recognition, the method including operations according to any of aspects 1 to 13.

Aspect 15: A computer-readable medium comprising at least one instruction for causing a computer or processor to perform operations according to any of aspects 1 to 13.

Aspect 16: An apparatus for facial recognition, the apparatus including means for performing operations according to any of aspects 1 to 13.

Aspect 17: A wireless device for determining presence of a user. The wireless device includes at least one transceiver; at least one memory; and at least one processor coupled to the at least one transceiver and the at least one memory. The at least one processor is configured to: process a first received waveform that is a reflection of a first radio frequency (RF) waveform; determine, based on RF sensing data associated with the first received waveform, a presence of a user; in response to determining the presence of the user, transmit, via the at least one transceiver, a second RF waveform having a higher bandwidth than the first RF waveform; process a second received waveform that is a reflection of the second RF waveform from the user; and determine, based on RF sensing data associated with the second received waveform, at least one of a head presence of the user or a head orientation of the user.

Aspect 18: The wireless device according to aspects 17, wherein the at least one processor is configured to: in response to determining that the head orientation of the user is facing away for a predetermined time, dim a display backlight on the first wireless device.

Aspect 19: The wireless device according to any one of aspects 17 or 18, wherein the at least one processor is configured to: in response to determining that the head presence of the user is false for a predetermined time, lock access to the first wireless device.

Aspect 20: The wireless device according to any one of aspects 17 to 19, wherein the first RF waveform comprises a Wi-Fi signal that is transmitted by an omnidirectional antenna on first wireless device.

Aspect 21: The wireless device according to any one of aspects 17 to 20, wherein the RF sensing data comprises channel state information (CSI) data.

Aspect 22: The first wireless device according to any one of aspects 17 to 21, wherein, to determine the presence of the user, the at least one processor is configured to: track a movement of the user; and determine that the user is within a threshold distance to the first wireless device.

Aspect 23: The wireless device according to any one of aspects 17 to 22, wherein the RF sensing data comprises data associated with at least one received leakage signal that does not reflect from any objects and corresponds to the first RF waveform.

Aspect 24: A method of determining presence of a user, the method including operations according to any of aspects 17 to 23.

Aspect 25: A computer-readable medium comprising at least one instruction for causing a computer or processor to perform operations according to any of aspects 17 to 23.

Aspect 26: An apparatus for determining presence of a user, the apparatus including means for performing operations according to any of aspects 17 to 23.

What is claimed is:

1. A first wireless device for facial recognition, comprising:
   at least one transceiver;
   at least one memory; and
   at least one processor coupled to the at least one memory and the at least one transceiver, the at least one processor is configured to:
      receive, via the at least one transceiver, a first received waveform that is a reflection of a first radio frequency (RF) waveform;
      determine, based on RF sensing data associated with the first received waveform, a presence of a user, wherein the RF sensing data includes channel state information (CSI) data corresponding to a direct path of the first RF waveform and CSI data corresponding to a reflected path of the first received waveform; and
      in response to determining the presence of the user, initiate facial authentication of the user.

2. The first wireless device of claim 1, wherein the at least one processor is configured to:
   transmit, via the at least one transceiver, a second RF waveform having a higher bandwidth than the first RF waveform;
   receive, via the at least one transceiver, a second received waveform that is a reflection of the second RF waveform from the user; and
   determine, based on RF sensing data associated with the second received waveform, at least one of a head presence of the user or a head orientation of the user.

3. The first wireless device of claim 2, wherein the at least one processor is configured to:
   in response to determining that the head orientation of the user is facing away for a predetermined time, dim a display backlight on the first wireless device.

4. The first wireless device of claim 2, wherein the at least one processor is configured to:
   in response to determining that the head presence of the user is false for a predetermined time, lock access to the first wireless device.

5. The first wireless device of claim 1, wherein the first RF waveform comprises a Wi-Fi signal that is transmitted by an omnidirectional antenna on the first wireless device.

6. The first wireless device of claim 1, wherein the first RF waveform is transmitted by a second wireless device.

7. The first wireless device of claim 1, wherein, to determine the presence of the user, the at least one processor is configured to:
   track a movement of the user; and
   determine that the user is within a threshold distance to the first wireless device.

8. The first wireless device of claim 1, wherein, to initiate facial authentication of the user, the at least one processor is configured to:
   transmit, via the at least one transceiver, a plurality of extremely high frequency (EHF) waveforms;
   receive, via the at least one transceiver, a plurality of reflected waveforms corresponding to the plurality of EHF waveforms; and
   generate, based on RF sensing data associated with the plurality of reflected waveforms, a facial signature associated with the user.

9. The first wireless device of claim 1, further comprising a camera, wherein, to initiate facial authentication of the user, the at least one processor is configured to:
   capture at least one image of a face of the user using the camera.

10. The first wireless device of claim 1, wherein the RF sensing data further comprises CSI data associated with at least one received leakage signal that does not reflect from any objects and corresponds to the first RF waveform and the direct path.

11. The first wireless device of claim 1, wherein the at least one processor is configured to:
    determine, based on the facial authentication, that the user is authorized to access the first wireless device; and
    in response to determining that the user is authorized to access the first wireless device, enable access to the first wireless device.

12. The first wireless device of claim 1, wherein the at least one processor is configured to:
    determine, based on the facial authentication, that the user is authorized to access one or more other wireless devices; and
    in response to determining that the user is authorized to access the one or more other wireless devices, enable access to at least one wireless device from the one or more other wireless devices.

* * * * *